(12) United States Patent
Oeverland

(10) Patent No.: US 11,933,927 B2
(45) Date of Patent: *Mar. 19, 2024

(54) SEISMIC SENSOR ASSEMBLY OVERVOLTAGE PROTECTION CIRCUITRY

(71) Applicant: Schlumberger Technology Corporation, Sugar Land, TX (US)

(72) Inventor: Ole Oeverland, Asker (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,977

(22) Filed: Mar. 3, 2023

(65) Prior Publication Data

US 2023/0204806 A1 Jun. 29, 2023

Related U.S. Application Data

(63) Continuation of application No. 16/310,662, filed as application No. PCT/US2017/039369 on Jun. 27, 2017, now Pat. No. 11,635,537.

(60) Provisional application No. 62/356,653, filed on Jun. 30, 2016.

(51) Int. Cl.
*G01V 1/18* (2006.01)
*G01D 11/24* (2006.01)
*G01V 1/16* (2006.01)
*H02H 9/04* (2006.01)

(52) U.S. Cl.
CPC ............. *G01V 1/181* (2013.01); *G01D 11/24* (2013.01); *G01D 11/245* (2013.01); *G01V 1/164* (2013.01); *H02H 9/04* (2013.01)

(58) Field of Classification Search
CPC ........ G01V 1/181; G01V 1/164; G01D 11/24; G01D 11/245; H02H 9/04; H01R 13/648; H02G 13/00
See application file for complete search history.

(56) References Cited

U.S. PATENT DOCUMENTS

| | | | |
|---|---|---|---|
| 3,688,251 | A | 8/1972 | Morris |
| 4,967,400 | A | 10/1990 | Woods |
| 5,369,626 | A | 11/1994 | Carroll |
| 6,301,195 | B1 | 10/2001 | Faber |
| 6,786,297 | B1 | 9/2004 | Menard |
| 8,923,095 | B2 | 12/2014 | Pettersen |
| 9,291,729 | B2 | 3/2016 | Pichot |
| 2002/0024791 | A1 | 2/2002 | Whitney |
| 2008/0008041 | A1 | 1/2008 | Pettersen |

(Continued)

FOREIGN PATENT DOCUMENTS

| | | |
|---|---|---|
| CN | 102419451 A | 4/2012 |
| EP | 1166595 A1 | 1/2002 |

OTHER PUBLICATIONS

International Search Report and Written Opinion issued in PCT application PCT/US2017/039369, dated Oct. 27, 2017 (16 pages).

(Continued)

*Primary Examiner* — Isam A Alsomiri
*Assistant Examiner* — Joseph C Fritchman
(74) *Attorney, Agent, or Firm* — Jeffrey D. Frantz

(57) ABSTRACT

A seismic sensor assembly can include a housing that defines a longitudinal axis; a sensor; sensor circuitry operatively coupled to the sensor; and overvoltage protection circuitry electrically coupled to the housing.

20 Claims, 12 Drawing Sheets

(56) References Cited

U.S. PATENT DOCUMENTS

| | | |
|---|---|---|
| 2010/0053391 A1 | 3/2010 | Huang |
| 2014/0126329 A1 | 5/2014 | Guyton |
| 2015/0218913 A1 | 8/2015 | Cooley |
| 2016/0091940 A1* | 3/2016 | Oh .......................... G06F 1/26 |
| | | 713/300 |
| 2016/0380451 A1* | 12/2016 | Pan .................... H02J 7/00714 |
| | | 320/136 |
| 2019/0250290 A1 | 8/2019 | Oeverland |

OTHER PUBLICATIONS

International Preliminary Report on Patentability issued in PCT application PCT/US2017/039369, dated Jan. 10, 2019 (13 pages).
Search and Exam Report issued in United Arab Emirates Patent Application No. P6001812/2018 dated Nov. 8, 2023, 10 pages.

* cited by examiner

SEISMIC SENSOR ASSEMBLY OVERVOLTAGE PROTECTION CIRCUITRY

RELATED APPLICATION

This application is a Continuation of U.S. application Ser. No. 16/310,662 filed 17 Dec. 2018, which is a National Stage Entry of International Application having Serial No. PCT/US2017/039369, filed 27 Jun. 2017 and claims priority to and the benefit of a U.S. Provisional Application Ser. No. 62/356,653, filed 30 Jun. 2016, which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

SUMMARY

A seismic sensor assembly can include a housing that defines a longitudinal axis; a sensor; sensor circuitry operatively coupled to the sensor; and overvoltage protection circuitry electrically coupled to the housing. A method can include mounting an overvoltage protection circuit board to a subassembly of a seismic sensor assembly that includes a sensor circuit board and a housing cover; electrically coupling a wire of the overvoltage protection circuit board to a ground shield via a coupling mechanism that couples the ground shield to a housing; and securing the housing cover to the housing. An overvoltage protection circuitry unit kit for a seismic sensor assembly can include a board that includes a first side, a second side and mounting features that correspond to features of a subassembly of a seismic sensor assembly, that comprises a seismic sensor circuit board, to face the first side toward the seismic sensor circuit board; and circuitry mounted to the second side of the board where the circuitry includes at least one lightning protection circuit component. Various other assemblies, components, kits, methods, systems, etc. are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 1:
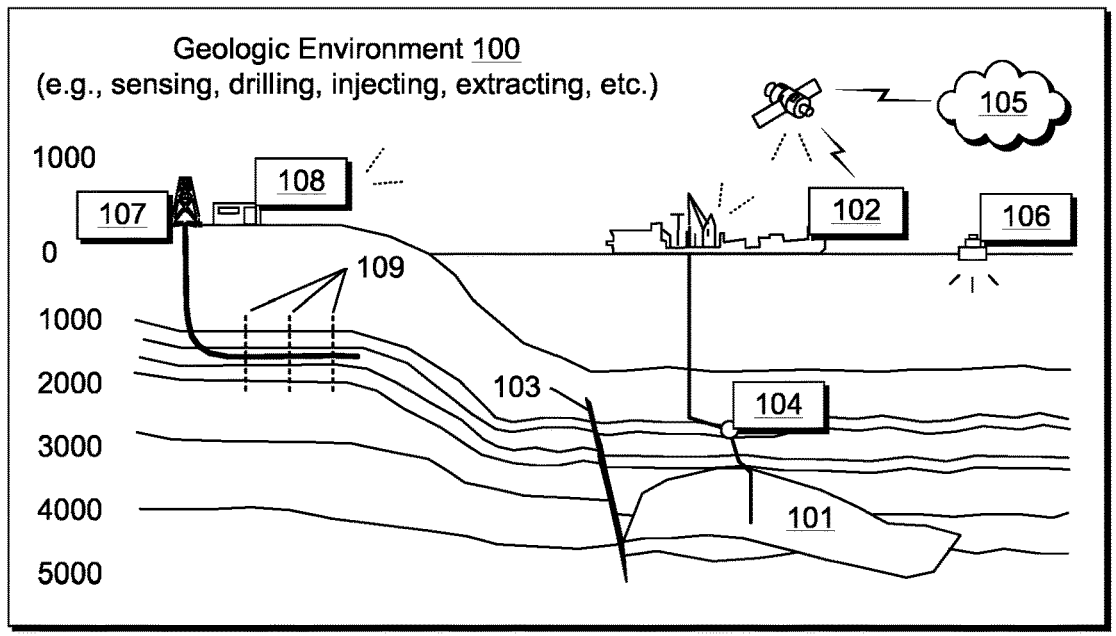
FIG. 1 illustrates an example of a geologic environment and an example of a technique.
Figure 1:
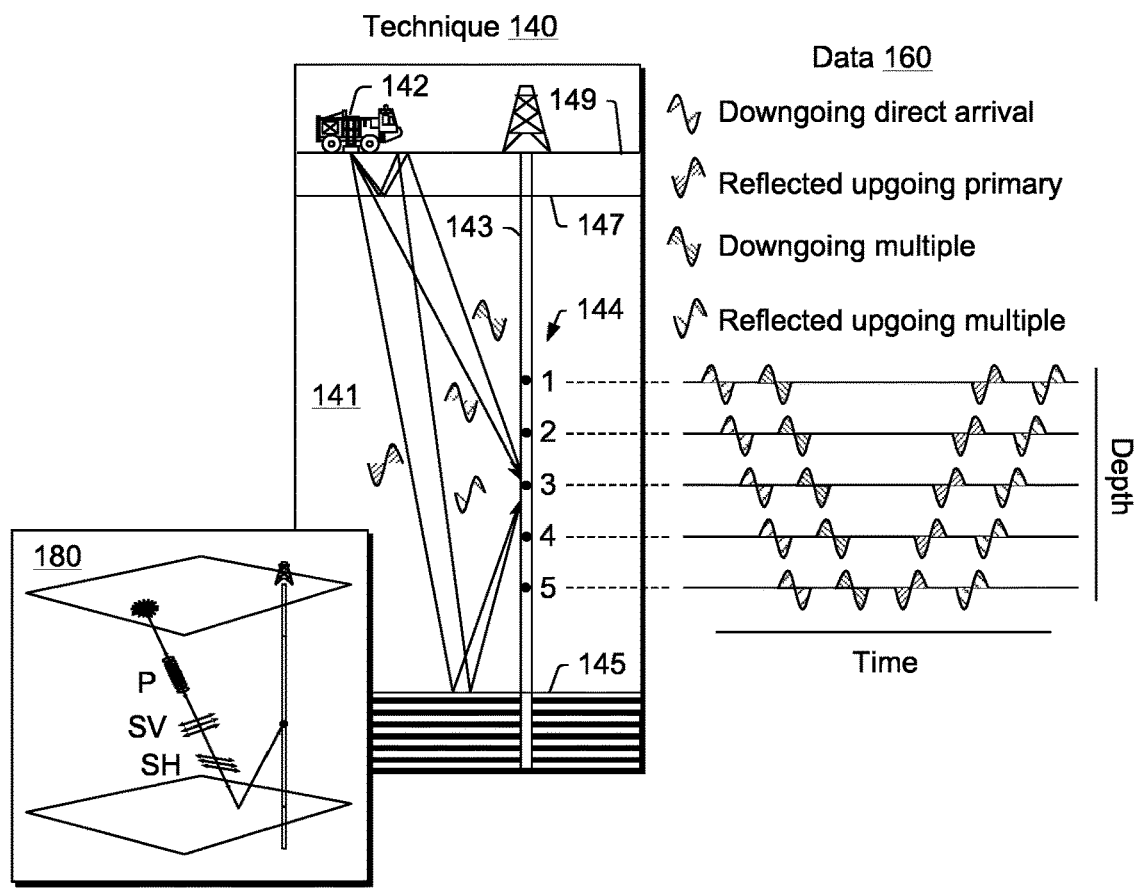

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data (see, e.g., data 160). As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specify one or more location coordinate of a feature in a geologic environment, one or more characteristics of a feature in a geologic environment, etc.

As an example, the geologic environment 100 may be referred to as or include one or more formations. As an example, a formation may be a unit of lithostratigraphy, for example, a body of rock that is sufficiently distinctive and continuous that it can be mapped. As an example, in stratigraphy, a formation may be a body of strata of predominantly one type or combination of types, for example, where multiple formations form groups, and subdivisions of formations are members.

As an example, a sedimentary basin may be a depression in the crust of the Earth, for example, formed by plate tectonic activity in which sediments accumulate. Over a period of geologic time, continued deposition may cause further depression or subsidence. With respect to a petroleum systems analysis, if rich hydrocarbon source rocks occur in combination with appropriate depth and duration of burial, hydrocarbon generation may possibly occur within a basin. Exploration plays and prospects may be developed in basins or regions in which a complete petroleum system has some likelihood of existing. The geologic environment 100 of FIG. 1 may include one or more plays, prospects, etc.

As an example, a system may be implemented to process seismic data, optionally in combination with other data. Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (e.g., about properties and/or structures of a subsurface region).

As an example, a system may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components (e.g., modules, blocks, etc.) may be implemented as add-ons (or plug-ins) that conform to and operate according to specifications of a framework environment (e.g., according to application programming interface (API) specifications, etc.).

As an example, seismic data may be processed using a framework such as the OMEGA® framework (Schlumberger Limited, Houston, TX). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

In the example of FIG. 1, the geologic environment 100 includes an offshore portion and an on-shore portion. As an example, a geologic environment may be or include one or more of an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\varepsilon$, $\delta$ and $\gamma$. The Thomsen parameter $\delta$ describes depth mismatch between logs (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\varepsilon$ and $\gamma$ may be estimated from wave data while estimation of the Thomsen parameter $\delta$ may involve access to additional information.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

As an example, seismic data acquisition can include, for example, 3D and/or 4D land seismic data acquisition, such as during exploration for underground hydrocarbon-bearing reservoirs, or monitoring existing reservoirs. As an example, electromagnetic signals may be used to transfer data to and/or from the sensor units, to transmit power, and/or to receive instructions to operate the sensor units.

Figure 2:
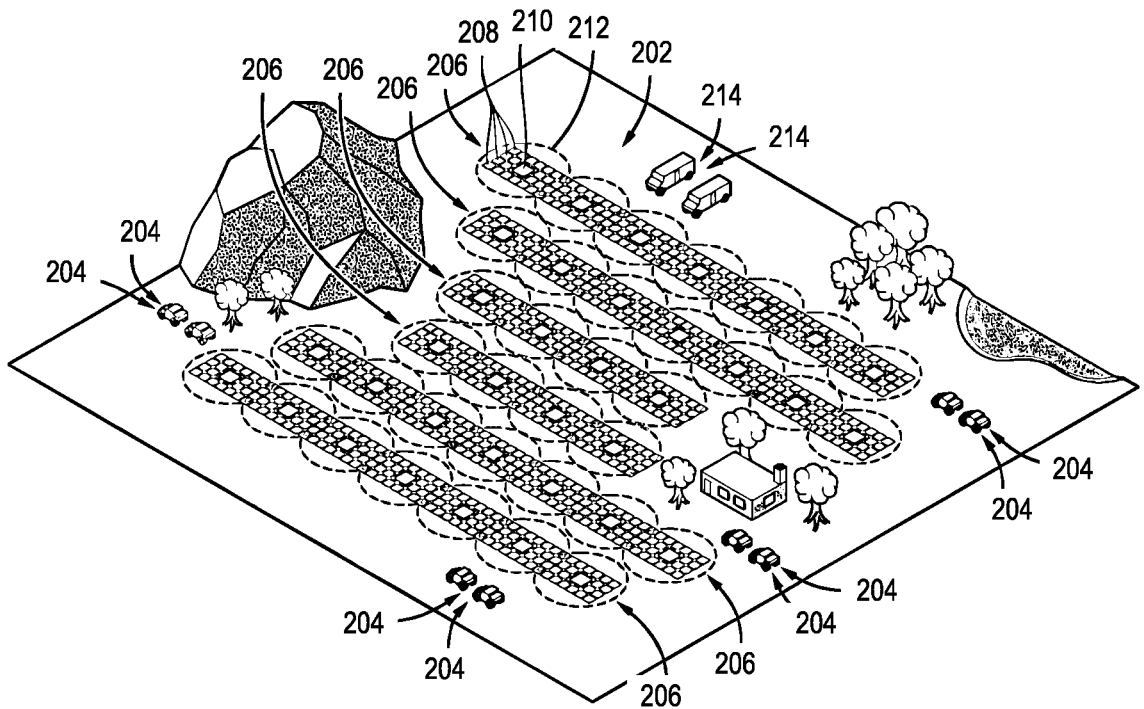
FIG. 2 illustrates an example of a survey technique and associated examples of equipment.
Figure 2:
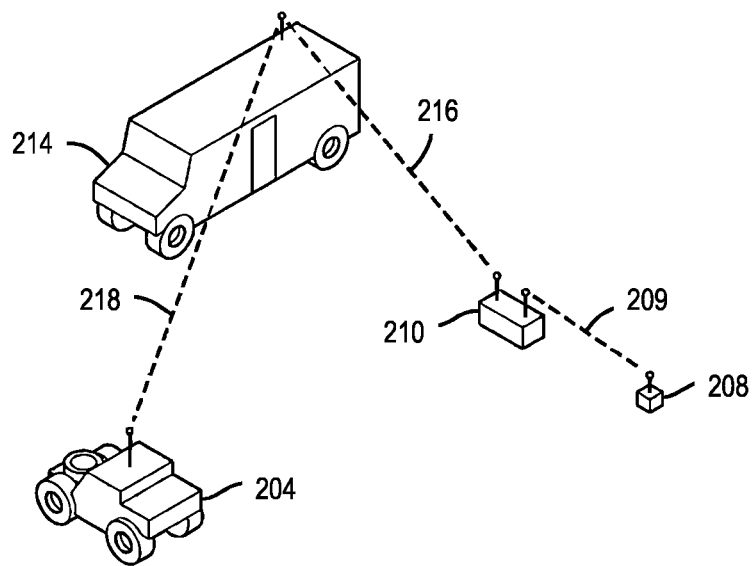

An example of a simplified schematic view of a land seismic data acquisition system is illustrated in FIG. 2. As shown, an area 202 to be surveyed may or may not have physical impediments to direct wireless communication between, for example, a recording station 214 (which may be a recording truck) and a vibrator 204. A plurality of vibrators 204 may be employed, as well as a plurality of sensor unit grids 206, each of which may have a plurality of sensor units 208.

As illustrated in the example of FIG. 2, for example approximately 24 to about 28 sensor units 208 may be placed in a vicinity (e.g., a region) around a base station 210. The number of sensor units 208 associated with each base station 210 may vary, for example, a survey. Circles 212 indicate an approximate range of reception for each base station 210.

In the system of FIG. 2, the plurality of sensor units 208 may be employed in acquiring and/or monitoring land-seismic sensor data for the area 202 and transmitting the data to the one or more base stations 210. Communications between the vibrators 204, the base stations 210, the recording station 214, and the seismic sensors 208 may be wireless (e.g., at least in part via air for a land-based system; or, e.g., optionally at least in part via water for a sea-based system).

FIG. 2 also shows an example of equipment with respect to a wireless data network where the wireless data network can include the seismic sensors 208 transmitting at least a portion of seismic data they sense to the one or more base stations 210 via a first wireless link 209, which in turn can transmit at least some data they receive to the recording station 214 via a second wireless link 216. As an example, commands may be sent from recording station 214 to the vibrators 204 via the wireless link 218, and, to the extent data is exchanged between the vibrators 204 and the recording station 214, the wireless links 218 may be considered part of the wireless data network.

Figure 3:
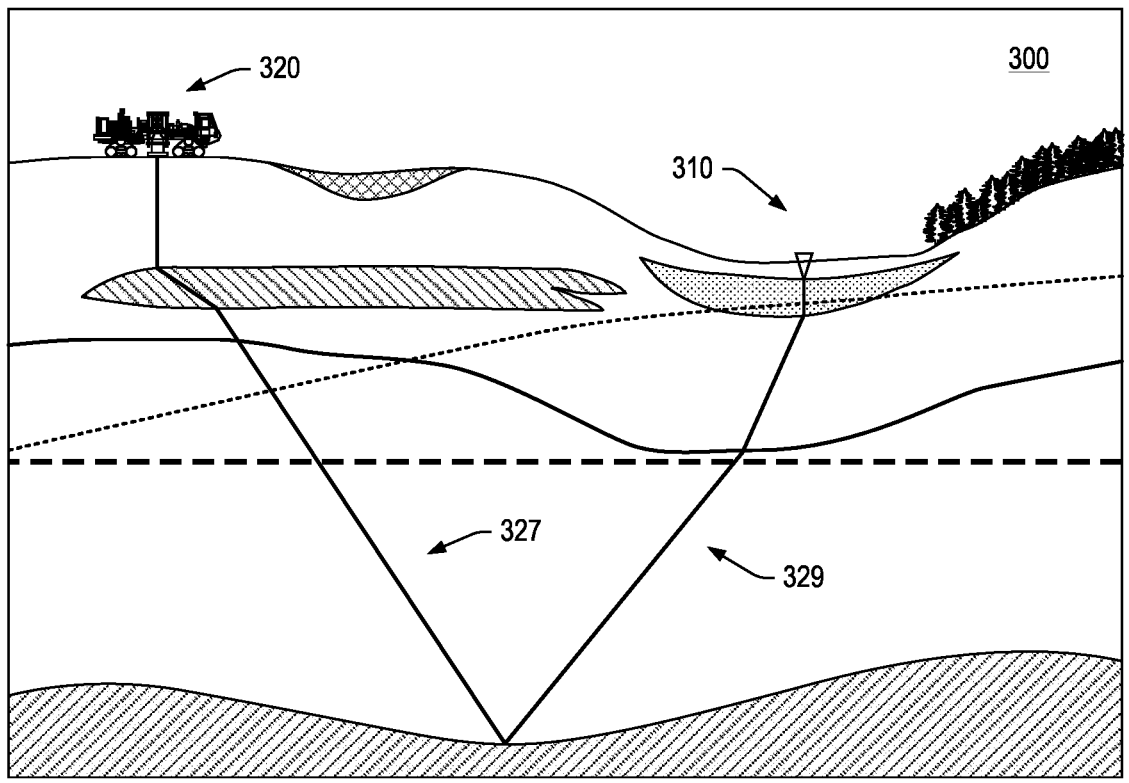
FIG. 3 illustrates examples of equipment deployed in an example of a field installation.
Figure 3:
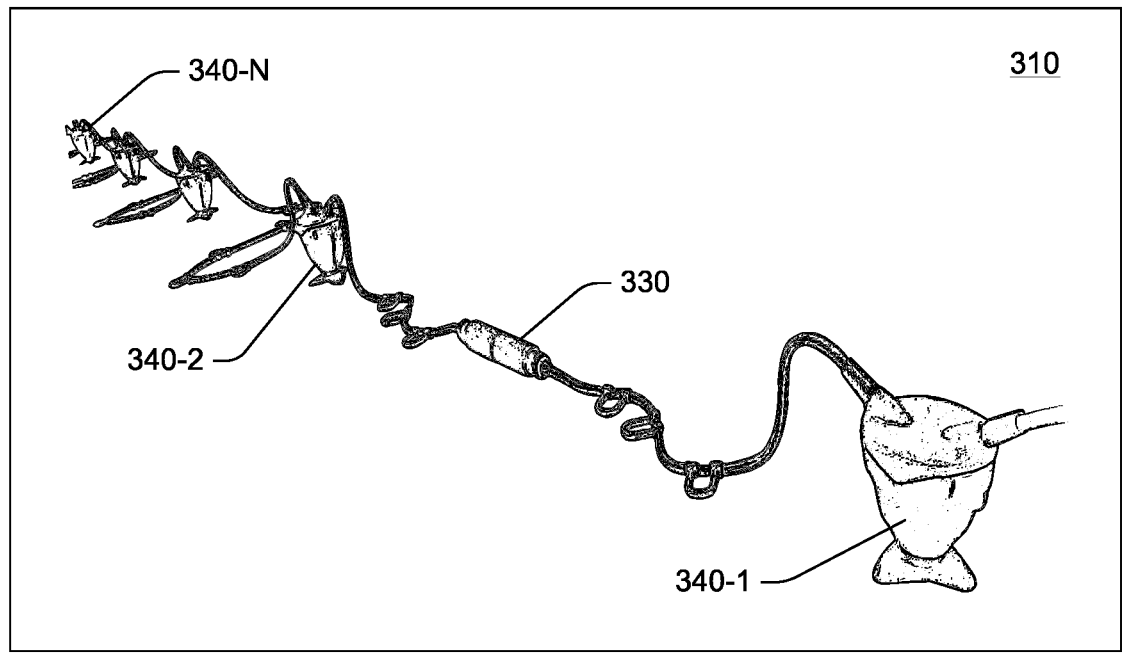

FIG. 3 shows an example of a geologic environment 300, example equipment 310 and 320, an example of downgoing energy 327, an example of upgoing energy 329 where the equipment 310 can include one or more cables 330 and a plurality of sensor units 340-1, 340-2 to 340-N as, for example, nodes in an array or grid.

The equipment 310 and 320 can be part of a field installation where the equipment 310 that includes an array of sensor units for performing a seismic survey where the equipment 320 includes one or more seismic energy emission vehicles that can emit seismic energy to be sensed by the array of sensors where data can be collected, for example, by a receiver vehicle that may be as operatively coupled to the array of sensors.

In the example of FIG. 3, the geologic environment 300 may be a desert such that the cable 330 that includes the individual sensor units 340 for deployment by an individual as that individual walks along paths, which may be, for example, inline or crossline paths associated with a seismic survey. For example, the individual may carry a rod where hooks may allow for looping the cable 330 and where the hooks may be slide off an end of the rod as the individual positions the individual sensor units 340. For example, the individual sensor units 340 can include spikes that can be inserted into sand of a desert environment or, for example, tripod or other style base(s). As an example, the spikes may be of a length of the order of about 10 cm and be capable of conducting seismic energy to circuitry of the individual sensor units 340.

The equipment 310 represents a deployed line of sensor units 340-1, 340-2 to 340-N. As mentioned, such a line of sensors may be an inline or a crossline of a seismic survey.

As an example, a sensor unit may be a UNIQ™ sensor unit (Schlumberger Limited, Houston, Texas) or another type of sensor unit. As an example, a sensor unit can include an accelerometer or accelerometers. As an example, a sensor may be a geophone. As an example, a sensor may include circuitry for 1 C acceleration measurement, 2 C acceleration measurement and/or 3 C acceleration measurement. As an example, a sensor may be self-testing and/or self-calibrating. As an example, a sensor unit can include memory, for example, to perform data buffering and optionally retransmission. As an example, a sensor unit can include short circuit isolation circuitry, open circuit protection circuitry and earth-leakage detection and/or isolation circuitry.

As an example, a sensor unit may include location circuitry (e.g., GPS, etc.). As an example, a sensor unit can include temperature measurement circuitry. As an example, a sensor unit can include humidity measurement circuitry. As an example, a sensor unit can include circuitry for automated re-routing of data and/or power (e.g., as to supply, connection, etc.).

As an example, a sensor unit may weigh about 0.40 kg (e.g., about 0.85 lb). As an example, a sensor unit may have a height of about 90 mm (e.g., about 3.5 in), a width of about 90 mm (e.g., about 3.5 in) and a depth of about 75 mm (e.g., about 3 in). As an example, a sensor unit may include one or more base options. For example, while a spike is mentioned, other options may include a tripod, an Artic base, etc. As an example, a sensor unit may be suitable for use in shallow water (e.g., up to a depth of several meters). As an example, a sensor unit may include a temperature operational range of about −40 degrees C. to about 70 degrees C. (e.g., about −40 degrees F. to about 160 degrees F.). As an example, a sensor unit may be rated to operate at voltages from about 5 volts to about 100 volts or more. As an example, consider a sensor that operates in a range of about 25 volts to about 40 volts (e.g., plus voltage or minus voltage).

As mentioned, sensor units may be cabled to form a sensor string. As an example, consider a string of about 10 sensors where a lead-in length is about 7 meters, a mid-section length is about 14 meters and a weight is about 15 kg. As another example, consider a string of about 5 sensor units where a lead-in length is about 15 meters and a mid-section length is about 30 meters and a weight is about 12 kg. Such examples may be utilized to understand dimensions of an array of sensors and, for example, how far a sensor unit is from one or more neighbors, to which it may be operatively coupled (e.g., via one or more conductors, conductive materials, etc.).

As to a power insertion unit (PIU), such a unit can be utilized for power and/or data routing. For example, such a unit may provide power for a few sensor units to tens of sensor units to hundreds of sensor units (e.g., consider a PIU that can power 500 or more sensors).

As an example, a PIU may include lightening and/or emergency shutdown protection (e.g., ESD). As an example, a PIU can include communication and/or location circuitry.

As an example, an installation can include a fiber-optic exchanger unit (FOX). For example, such a unit may be a router that can communicate with a PIU. As an example, fiber optic cables may be included in an installation. For example, consider FOX and PIU fiber optic couplings.

As an example, an installation may include over a thousand sensor units. As an example, an installation may include tens of thousands of sensor units. As an example, an installation may include over one hundred thousand sensor units.

Figure 4:
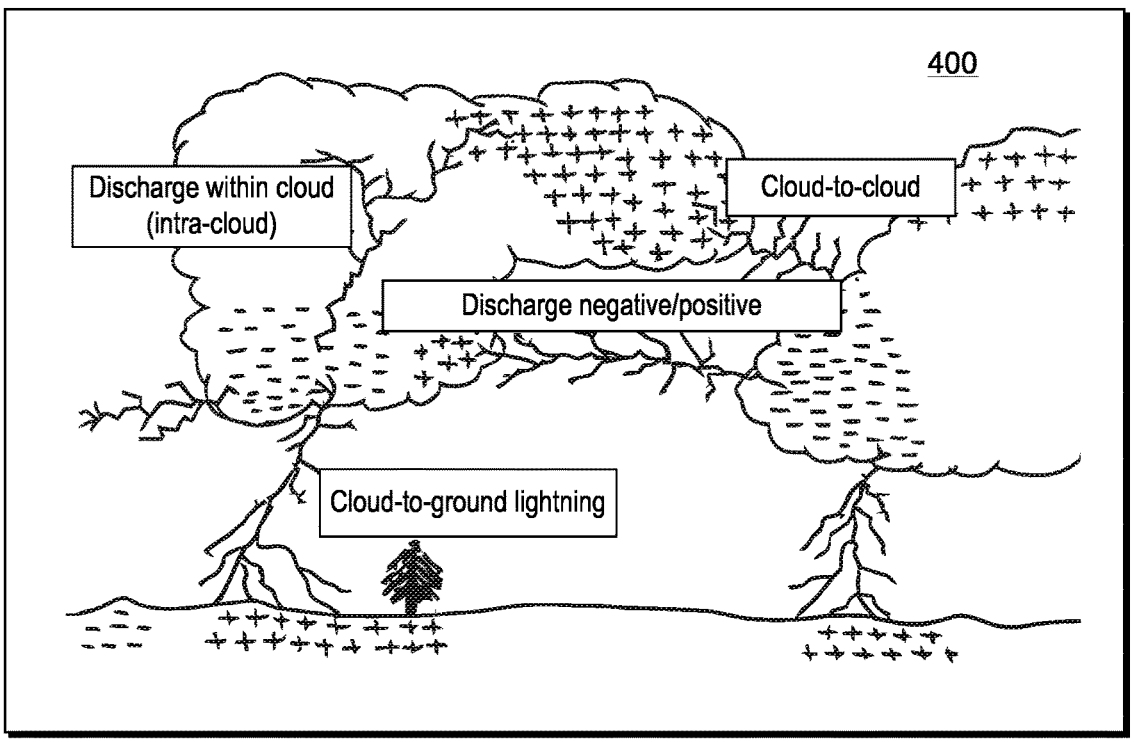
FIG. 4 illustrates examples of lightning and an example of a lightning strike as to equipment deployed in a field.
Figure 4:
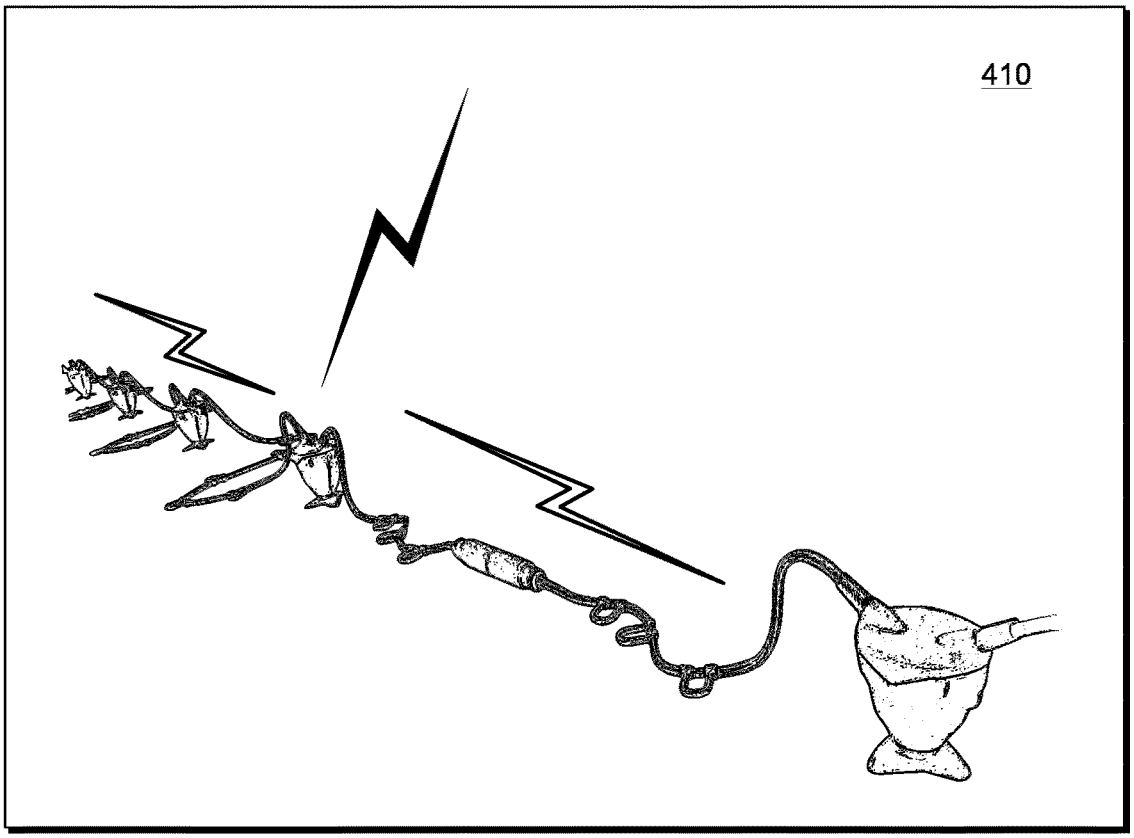

FIG. 4 shows an example of lightning (e.g., lightening) generation and discharge 400 and an example of deployed sensor units 410 being struck by lightning.

A lightning flash is composed of a series of strokes with an average of about four. The length and duration of each lightning stroke vary, but may average about 30 microseconds (e.g., consider an average peak power per stroke of about $10^{12}$ watts). Sound is generated along the length of the lightning channel as the atmosphere is heated by the electrical discharge to the order of 20,000 degrees C. This compresses the surrounding clear air producing a shock wave, which then decays to an acoustic wave as it propagates away from the lightning channel.

While some types of lightning are illustrated in FIG. 4, there are numerous names and descriptions of various types and forms of lightning. Some identify subcategories, and others may arise from optical illusions, appearances, or myths. Some popular terms include: ball lightning, heat lightning, bead lightning, sheet lightning, silent lightning, black lightning, ribbon lightning, colored lightning, tubular lightning, meandering lightning, cloud-to-air lightning, stratospheric lightning, red sprites, blue jets, and elves.

As to lightning discharge, with the initial breakdown of air in a region of strong electric fields, a streamer may begin to propagate downward toward the Earth. It may move in discrete steps of about 50 meters each and be called a stepped leader. As it grows, it can create an ionized path depositing charge along the channel, and as the stepped leader nears the Earth, a large potential difference can be generated between the end of the leader and the Earth. As an example, a streamer may be launched from the Earth and intercept the descending stepped leader just before it reaches the ground. Once a connecting path is achieved, a return stroke flies up the already ionized path at close to the speed of light. This return stroke releases tremendous energy, bright light and thunder. Occasionally, where a thunderstorm grows over a tall Earth grounded object, such as a radio antenna, an upward leader may propagate from the object toward the cloud. This "ground-to-cloud" flash generally transfers a net positive charge to Earth and is characterized by upward pointing branches.

A so-called "dry" thunderstorm is a thunderstorm that produces thunder and lightning, but its precipitation largely evaporates before reaching the ground. "Dry" lightning is a term that may be used to refer to lightning strikes occurring in such scenarios; noting that "dry" lightning is a technical misnomer since lightning itself is neither wet nor dry.

Dry thunderstorms can occur in deserts or places where atmospheric water vapor is low. Because dry air tends to absorb liquid water, causing it to change phase into vapor, most of it is absorbed before reaching the ground and form virga.

In the example of FIG. 4, a lightning strike can cause energy to travel along a cable or cables where it may impact one or more other sensor units.

As an example, a land sensor unit can include one or more lightning mitigation components. For example, the sensor unit 340-1 of FIG. 3 may include one or more lightning mitigation components, which may be, as an example, one or more optional components that can be fit to the sensor unit 340-1 (e.g., by an individual, etc.).

As an example, a land sensor unit can optionally include grounding ability that is increased, for example, by way of a conductive bracket, which may be a substantially U-shaped metal part.

As mentioned and illustrated in FIG. 4, the cabled land sensor units 410 can spread energy from lightning strikes. For example, energy from a single strike can travel via a cable or cables and damage a relatively large number of sensor units. Such damage may be quantified as being in a radius, a block, etc. as to a strike location associated with a strike and sensor units within the effected region. As an example, one or more lightning mitigation components can help to minimize a damage dimension (e.g., a damage radius). For example, by increasing the grounding of sensors, the number of sensor units that are damaged can be reduced.

Figure 5:
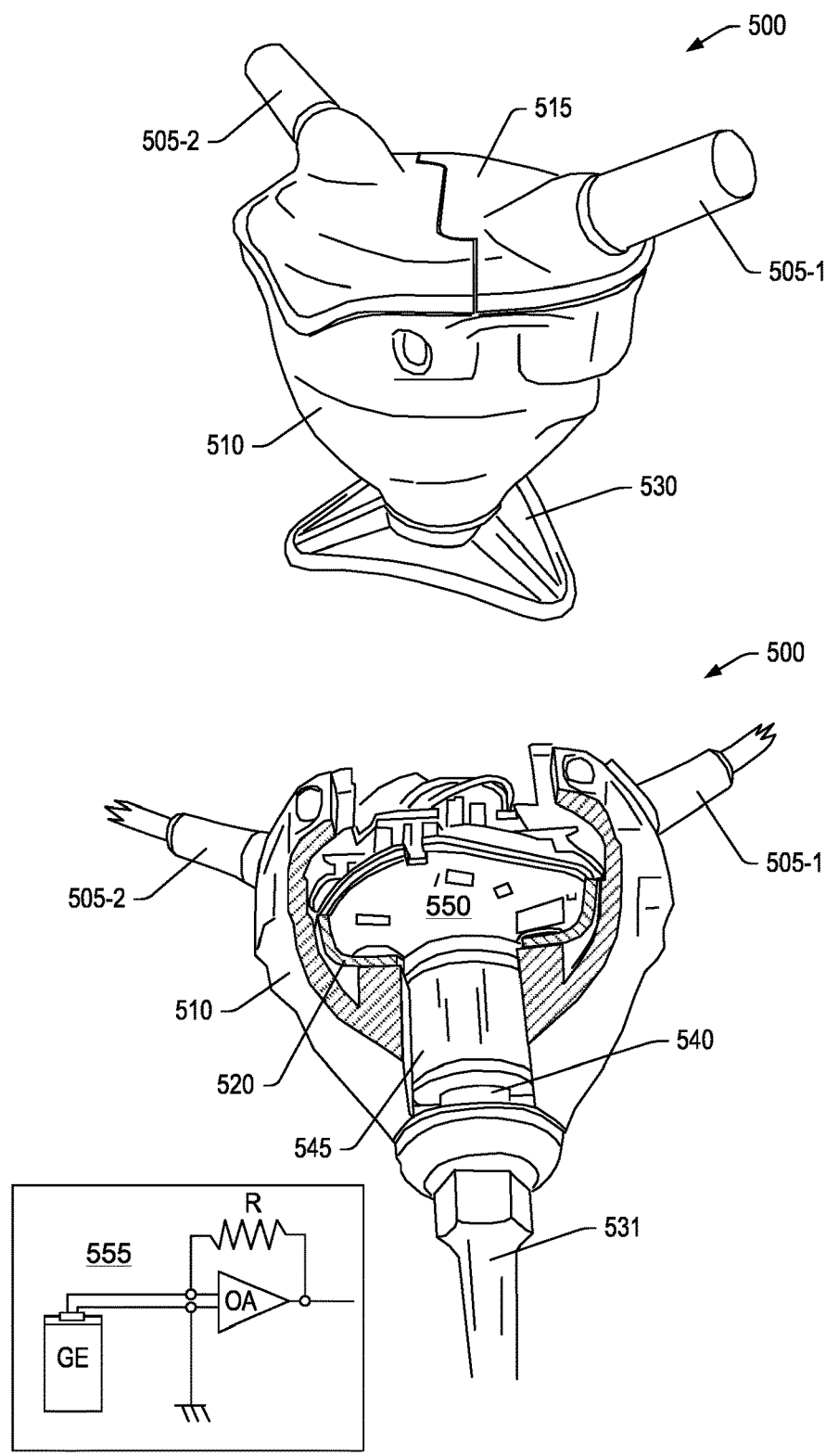
FIG. 5 illustrates an example of a sensor unit, which may be referred to as a sensor assembly.

FIG. 5 shows an example of an assembly 500 (e.g., a sensor unit) that includes cable connectors 505-1 and 505-2, a housing 510, a cover 515, a ground shield 520, a base 530 or a spike 531, a sensor driver 540, a sensor assembly 545, and a circuitry board 550. As an example, the assembly 500 can include one or more clocks (e.g., sensor clocks, etc.).

As an example, the circuitry board 550 can be a geophone accelerometer circuitry board (a GAC board), which can include or be operatively coupled to a clock of the assembly 500. As an example, the assembly 500 can include a seismic system geophone accelerometer (a seismic system GAC) as the sensor assembly 545 that can sense motion (e.g., as operatively coupled to the sensor driver 540) where circuitry may be utilized to reduce signal distortion and/or increase bandwidth (e.g., consider an approximately 18 Hz geophone with additional electronic circuitry).

As an example, consider the example simplified circuitry diagram 555 of FIG. 5 where a geophone element (GE) can be connected across an input of an operational amplifier (OpAmp, labeled OA) circuit. In such an example, a feedback resistor (R) can connect the OpAmp circuit output to the geophone element. In such an example, if a GAC coil moves within its magnetic field, the voltage it generates is detected by the OpAmp circuit, which responds by sending a current back through the feedback resistor (R), which can act to damp coil movement. In such an example, as force to hold the coil stationary can be proportional to the coil acceleration, the output voltage of the circuitry represents earth motion expressed as acceleration. As an example, as coil movement is reduced by more than an order of magnitude, the associated signal distortion may also be reduced by more than an order of magnitude. As an example, a negative feedback loop can widen the pass-band of a signal that it controls. As an example, an 18 Hz tilt-indifferent geophone may be utilized as an accelerometer with an about −3 dB point below about 2 Hz. In such an example, choice of an about 18 Hz geophone may be suitable due to stiffness of springs and reduced coil displacement. As an example, such an arrangement may allow for operation in various orientations while achieving some amount of optimization as to characteristics of a pass-band.

As an example, the assembly 500 can include electrical shock protection circuitry, for example, the assembly can include conductive and/or non-conductive structural features and/or circuitry that can mitigate effects of lightning strikes (e.g., at or near the assembly 500, etc.). As an example, an assembly can include one or more gas discharge tubes (GDTs) and/or one or more thyristor surge protection devices (TSPDs) as part of a protection system.

As an example, the assembly 500 may be utilized in a field where a plurality of such assemblies is positioned according to a grid plan, etc., to form an array. As an example, various assemblies may be operatively coupled via one or more cables. For example, a cable or cables may be coupled to the cable connectors 505-1 and/or 505-2. As an example, in a field system, an individual assembly or sensor unit may be considered to be a node (e.g., a node of a grid, a node of an array, etc.).

As an example, the assembly 500 of FIG. 5 may be a UniQ™ sensor unit (Schlumberger Limited, Houston, Texas). As an example, an assembly or sensor unit may include circuitry that can output samples at intervals of 1 ms, 2 ms, 4 ms, etc. As an example, an assembly or sensor unit can include an analog to digital converter (ADC) such as, for example, a 24-bit sigma-delta ADC. As an example, an assembly or sensor unit can include synchronization circuitry such as, for example, GPS synchronization circuitry with an accuracy of about plus or minus 12.5 microseconds. As an example, an assembly or sensor unit can include circuitry for sensing of real-time and optionally continuous tilt, temperature, humidity, leakage, etc. As an example, an assembly or sensor unit can include calibration circuitry, which may be self-calibration circuitry.

As an example, the assembly 500 of FIG. 5 may be about 90 mm in height, about 90 mm in width and about 80 mm in depth. As an example, a base may be a spike, a tripod or other type of base. As an example, the assembly 500 of FIG. 5 may have a mass of about 0.4 kg. As an example, the assembly 500 of FIG. 5 may have a power consummation of the order of about 100 mW and an operating voltage in a range of about plus or minus 25 V to about plus or minus 40 V.

As an example, a field system that includes assemblies such as the assembly 500 of FIG. 5 may include one or more power insertion units (PIUs) such as, for example, the UniQ™ PIU (Schlumberger Limited, Houston, Texas). Such a unit may provide for power and/or data routing for a plurality of sensor units (e.g., up to hundreds of sensor units) and, for example, timing synchronization (e.g., via a clock and/or GPS). As an example, such a unit may include data capacity of about 75 channels or more (e.g., for sampling intervals of about 1 ms, 2 ms, 4 ms, etc.).

As an example, a field system that includes assemblies such as the assembly 500 of FIG. 5 may include a source control unit such as, for example, an integrated source control (ISC) or integrated point-receiver land seismic system unit (e.g., consider the UniQ™ ISC, Schlumberger Limited, Houston, Texas). As an example, a source control unit can directly and/or indirectly provide for control of seismic energy sources. As an example, a source control unit may be operatively coupled to a plurality of seismic energy sources (e.g., tens or hundreds of seismic energy sources).

In the example of FIG. 5, the assembly 500 includes the cable connectors 505-1 and 505-2 disposed at about 180 degrees from each other. As mentioned, a cable can include a plurality of such assemblies.

As an example, cables may come into opposite points on a sensor unit, which may facilitate fitting the sensor with a substantially U-shaped grounding part. In such an example, where a spike is optionally employed, the grounding part can be electrically coupled to the spike (see, e.g., the spike 531). As an example, where a base such as the base 530 is optionally employed, the grounding part may be electrically coupled to the base. As an example, the base 530 can be made at least in part of an electrically conductive material. As an example, a base and/or a spike may be in contact with ground (e.g., earth). As an example, a base and/or a spike may support and help orient a sensor unit on the ground. As an example, where lightning strikes a sensor unit and/or a cable operatively coupled to a sensor unit or units, the energy of the lightning may be dissipated at least in part via a base and/or a spike. As an example, one or more grounding components may be included that are made at least in part of electrically conductive material that can route energy associated with a lightning strike to a base and/or a spike.

As an example, a kit can include one or more components to retrofit a sensor unit where the one or more components can help to reduce impact of lightning strikes. As an example, a kit can optionally include a plurality of components, optionally including circuitry. For example, a kit may include a grounding component and may include protection circuitry, which may be provided as a protection circuitry board.

As mentioned, some relatively arid environments can be prone to lightning; whereas, other environments may be less prone. Thus, a kit can provide options for use where lightning may be likely. Such a kit may be usable without impacting a sensor unit's ability to sense seismic energy. For example, a sensor unit can function with or without a grounding retrofit kit and/or a protection circuitry kit. As an example, a kit may be relatively easy to install and/or remove, making transition or transitions minimal with respect to amount of time involved. As an example, a kit may be suitable for use with a base and/or a spike. As an example, a kit or kits may be provided with features that may optionally allow for tool-less installation. In such an example, a sensor unit may include one or more features that are already installed that allow for tool-less installation of a kit or kits. As an example, a tool-less installation kit or kits may allow for expedited installation and/or removal of one or more kit components. In such an example, tool-less installation may allow for on-site choices to be made, for example, depending on environmental and/or other conditions.

Figure 6:
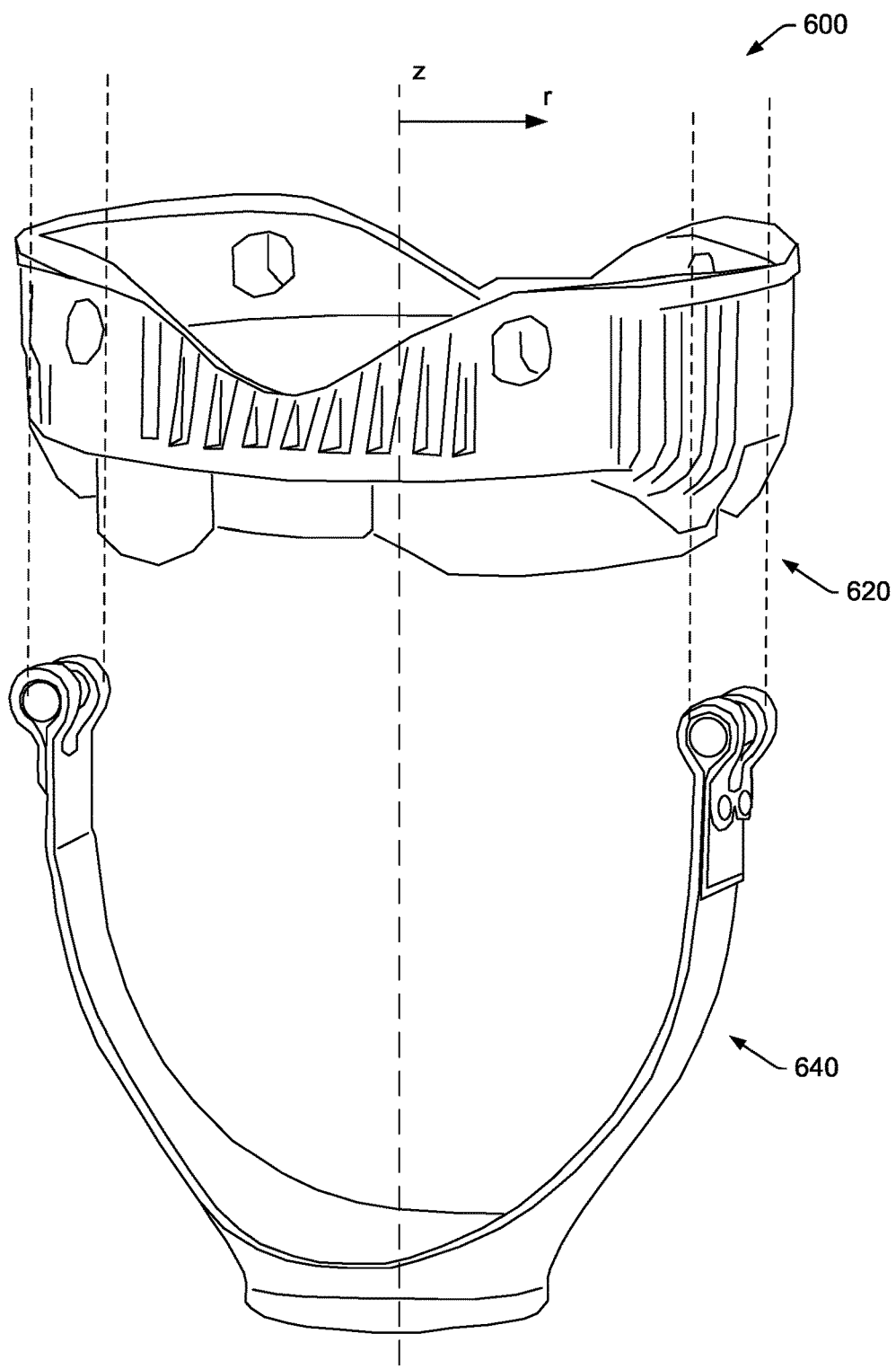
FIG. 6 illustrates an example of a portion of an assembly.

FIG. 6 shows an example of an assembly 600 that can be fit to a sensor unit such as, for example, the sensor unit 550 of FIG. 5. As shown, the assembly 600 includes a lightning protection unit 620 and a grounding clamp 640. As an example, a midsection portion of a sensor unit can includes cable connections and locking pins where the lightning protection unit 620 can include screws for tightening the lightning protection unit 620 to the sensor unit and where the grounding clamp 640 can be a substantially U-shaped electrically conductive component that can be operatively coupled to the lightning protection unit 620 at its open end (e.g., upper end of "U") and operatively coupled to a base plate (e.g., and/or a spike, etc.).

As an example, a kit may include the lightning protection unit 620 and the grounding clamp 640. In such an example, lighting protection of a sensor unit can be enhanced as such a kit can help ground the sensor (e.g., assembly). In such a manner, a number of sensor units in an array may include such kits where, the larger the number, the fewer the number of sensor units may be damaged near a strike.

As an example, grounding protection can be provided via a kit where the components of the kit provide a convenient and reliable physical path in metal (e.g., alloy, etc.) for connecting at least a portion of a sensor unit to a grounding point of the sensor.

As an example, a kit may be a single component such as, for example, the grounding clamp 640 of the example assembly 600 of FIG. 6. For example, a sensor may be provided with the lightning protection unit 620 and without the grounding clamp 640 where the grounding clamp 640 may be added on for use in an environment where risks exist as to lightning strikes.

As an example, a sensor unit can include circuitry that can help to protect the sensor unit from overvoltage as may be associated with electrical activity such as, for example, lightning. As an example, a sensor unit can include a piggyback overvoltage protection (POP) board that may be operatively coupled within a sensor unit, for example, over an existing main electronics board of the sensor unit. As an example, various types of circuitry of an assembly may be electrically connected to a common ground. As an example, one or more circuits may optionally be coupled to different grounds where such grounds may at some point be operatively coupled to earth.

As an example, circuitry such as overvoltage protection circuitry may be utilized with one or more types of land surface equipment where electrical assemblies can benefit from protection against lightning strikes. As an example, an electro-mechanical design of an overvoltage protection circuitry unit (e.g., a board, etc.) can provide added protection optionally without direct modification of existing electronics. For example, an overvoltage protection circuitry unit may be provided as part of a kit, which can be a kit that can help to protect a sensor unit from the effects of electricity such as, for example, lightning.

As an example, a POP board may be insertable for additional protection in a region (e.g., a chamber, etc.) where existing electronics of a device may also be positioned. In such an example, the POP board may be inserted and operatively coupled without making changes to existing electronics.

Figure 7:
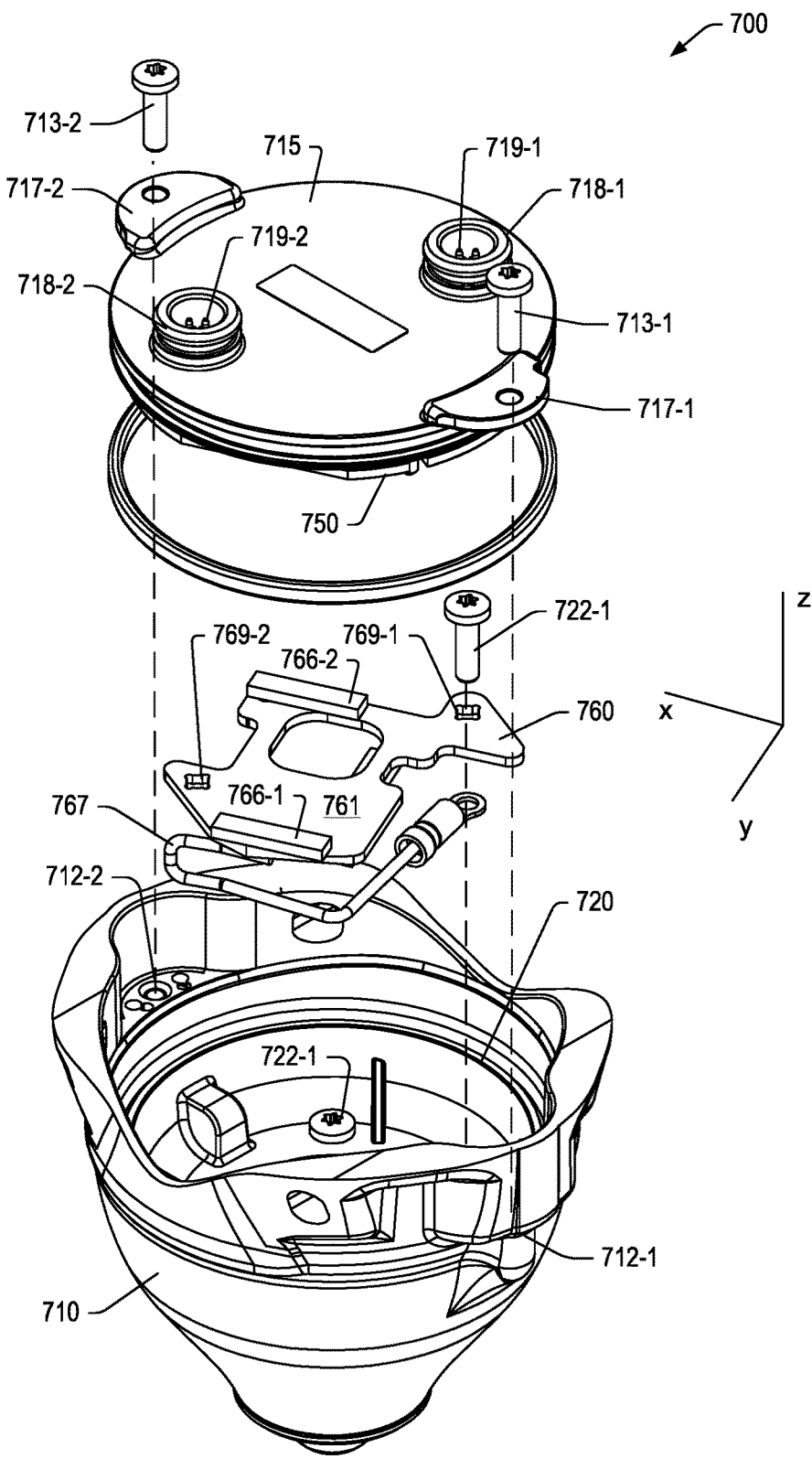
FIG. 7 illustrates an example of an assembly.

FIG. 7 shows an example of an assembly 700 that includes a housing 710, a housing insert 715, a ground shield 720, a first circuitry board 750 and a second circuitry board 760. In the example of FIG. 7, a Cartesian coordinate system is shown that can be used to describe one or more features of the assembly 700.

In the example of FIG. 7, dashed vertical lines represent how features may be aligned and brought together during an assembly process. For example, consider an assembly process that includes installing or removing the second circuitry board 760.

As shown, the housing 710 includes openings 712-1 and 712-2 that can receive bolts or screws 713-1 and 713-2 that can pass through openings 717-1 and 717-2 of the housing insert 715 to couple the housing insert 715 to the housing 710.

The housing insert 715 is shown as including connectors 718-1 and 718-2 for cables where each connector 718-1 and 718-2 includes electrical connectors 719-1 and 719-2 that can make electrical connections to wires of the cables as coupled to the connectors 718-1 and 718-2. As a cable or cables can be utilized for transmission of power, signals, commands, etc., the electrical connectors 719-1 and/or 719-2 are electrically coupled to the first circuitry board 750. Thus, where a cable or cables are subjected to energy from a lightning strike, such energy can travel through the cable or cables to the assembly 700 where such energy can be transferred to the electrical connectors 719-1 and 719-2. As an example, the electrical connectors 719-1 and 719-2 can be groups of pins, which may be, for example, copper pins. For example, each group can include two or more pins. As an example, consider four pins per group, which may be arranged in a rectangular manner (e.g., as a square, etc.).

As shown in the example of FIG. 7, the second circuitry board 760 includes an upper side 761 that faces the first circuitry board 750, optionally one or more pads 766-1 and 766-2 (e.g., insulating and resilient so as to absorb shock, etc.), a conductive wire or wires 767 and sockets 769-1 and 769-2 where electrical connections can be made between the electrical connectors 719-1 and 719-2 and the second circuitry board 760 and where the second circuitry board 760 can be electrically connected to the housing 710 via the conductive wire or wires 767, which can be in contact with the ground shield 720 via a bolt or screw 722-1 that can pass through or otherwise couple to a connector of the conductive wire or wires 767 (see, e.g., end connector with a washer-like conductive feature that can receive a shaft of the bolt or screw 722-1). In the example of FIG. 7, a bolt or screw 722-2 is shown as a mechanism that secures the ground shield 720 to the housing 710. As an example, the bolts or screws 722-1 and 722-2 can help to assure electrical contact between the ground shield 720 and the housing 710.

As an example, a path of energy from a lightning strike can be from a cable to an electrical connector 719 and to the second circuitry board 760 and, for example, to ground via one or more pathways that may include the ground shield 720 and/or the housing 710. In such an example, the second circuitry board 760 can include circuitry that can route energy applied at the electrical connector 719-1 and/or 719-2 to arresting circuity that can arrest the energy to reduce risk of damage to the first circuitry board 750 and/or one or more other components of the assembly 700.

As an example, the first circuitry board 750 can be a geophone accelerometer circuitry board (a GAC board). For example, the assembly 700 can include a seismic system geophone accelerometer (a seismic system GAC) as the sensor assembly 545 as in FIG. 5 that can sense motion (e.g., as operatively coupled to the sensor driver 540 as in FIG. 5) where circuitry may be utilized to reduce signal distortion and/or increase bandwidth (e.g., consider an approximately 18 Hz geophone with additional electronic circuitry).

As to the second circuitry board 760, it can include circuitry that acts to protect against overvoltage. As an example, the second circuitry board 760 may be a POP board. Such a board may be configured as a printed circuit board (PCB) with various components operatively coupled thereto. As an example, such a board can include components such as one or more gas discharge tubes (GDTs) and/or one or more thyristor surge protection devices (TSPDs) and/or one or more metal oxide varistors (MOVs).

As an example, such a board can include the conductive wire or other electrical conductor 767 that can be electrically coupled to the ground shield 720. In the example of FIG. 7, the relatively large gauge conductive wire 767 is screwed or bolted to the ground shield 720 while also being in electrical contact with the board 760 (e.g., via a solder, a weld or other coupling mechanism). In the example of FIG. 7, the ground shield 720 is disposed internally in the housing 710 and screwed, bolted, etc., to the housing 710. Further, the housing 710 can be supported by a base (see, e.g., the base 530 and the spike 531 of FIG. 5), which can be in contact with earth, etc. (e.g., ground).

As mentioned, an assembly process can include installing or removing the second circuitry board 760. For example, consider loosening the bolts or screws 713-1 and 713-2, lifting the housing insert 715, coupling the board 760 to an underside of the housing insert 715 and board 750 (e.g., as a subassembly), connecting the conductive wire 767 to the bolt or screw 722-1 and securing the bolt or screw 722-1 to the ground shield 720 (e.g., and/or to the housing 710). In such an example, the housing insert 715 may be repositioned such that the bolts or screws 713-1 and 713-2 can be tightened. As an example, coupling the board 760 can include press-fitting and/or soldering to electrically connect the board 760 to the electrical connectors 719-1 and/or 719-2 (e.g., depending on whether a single cable or two cables are to be operatively coupled to the connectors 718-1 and 718-2 of the assembly 700. As an example, such a process may optionally be performed on-site where, for example, a risk of lightning exists. For example, during a storm and/or lightning season, a crew may install boards such as a plurality of the boards 760 in sensor units of a sensor unit array for acquisition of seismic energy as part of a seismic survey.

As an example, the board 760 can include a plurality of GDTs, which may be selected as to size, shape, number, ratings, etc. A GDT can be a surge arrester device that include features to help arrest relatively high voltage transients induced by one or more phenomena such as, for example, one or more of lightning, inductive switching, electrostatic discharge, etc. As an example, a GDT can be a hermetically sealed gas filled ceramic tube with metal electrodes.

As an example, a GDT may function such that its gas tube begins conduction when an electron within the GDT gains sufficient energy to initiate ionization of gas. In such an example, complete ionization of the gas can take place through electron collision. Events leading up to this phenomenon occur when a gas tube is subjected to a rising voltage potential. Once the gas is ionized, breakdown occurs and the gas tube changes from a high impedance state to a virtual short circuit and thus, a transient can be diverted from circuitry to be protected.

As an example, arrester technology may be classified as crowbar or clamp. For example, crowbar can include air gap, carbon block, GDT, silicon controlled rectifier (SCR), etc.; while, for example, clamp can include Zener (avalanche) diode, metal oxide varistor (MOV), etc. As an example, an overvoltage protection unit or assembly may optionally implement one or more types of arresting technology.

As an example, a GDT may offer relatively high levels of performance on fast rising transients, for example, in a domain of about 100 V/μS to about 1 KV/μS, which includes at least some of those likely to be induced by one or more types of lightning disturbances (e.g., lightning strikes, etc.). As an example, a GDT may feature a relatively low capacitance (e.g., optionally about 1 pF or less) and may include an optimized internal geometry that provides low insertion loss at high frequencies (e.g., for broadband equipment). As an example, a GDT may be relatively robust, for example, able to divert a pulse of about 10,000 A pulse without destruction. As an example, a GDT may provide about a 20,000 A single shot surge capability (e.g., per an 8 μs rise/20 decay μs pulse as defined by IEC 61000-4-5). As an example, a GDT may be provided with a thermal failsafe option.

As an example, the board 760 can include a plurality of thyristor surge protective devices (TSPDs), which may be selected as to size, shape, number, ratings, etc. As an example, TSPDs may be arranged to be avalanche triggered components to help protect vulnerable circuits from electrical overstress such as, for example, overstress due to a lightning strike or strikes. TSPDs can protect by switching to a low on-state voltage (VT) of a few volts, thus providing a crowbar effect with high current capability. As an example, TSPDs may be included in multidirectional and/or unidirectional configurations. As an example, for unidirectional, the opposite direction (quadrant) from the switching mode may be specified either forward conducting or reverse blocking. As an example, after triggering, a TSPD(s) clamping voltage can allow for large current surges to flow while limiting heat dissipation.

Figure 8:
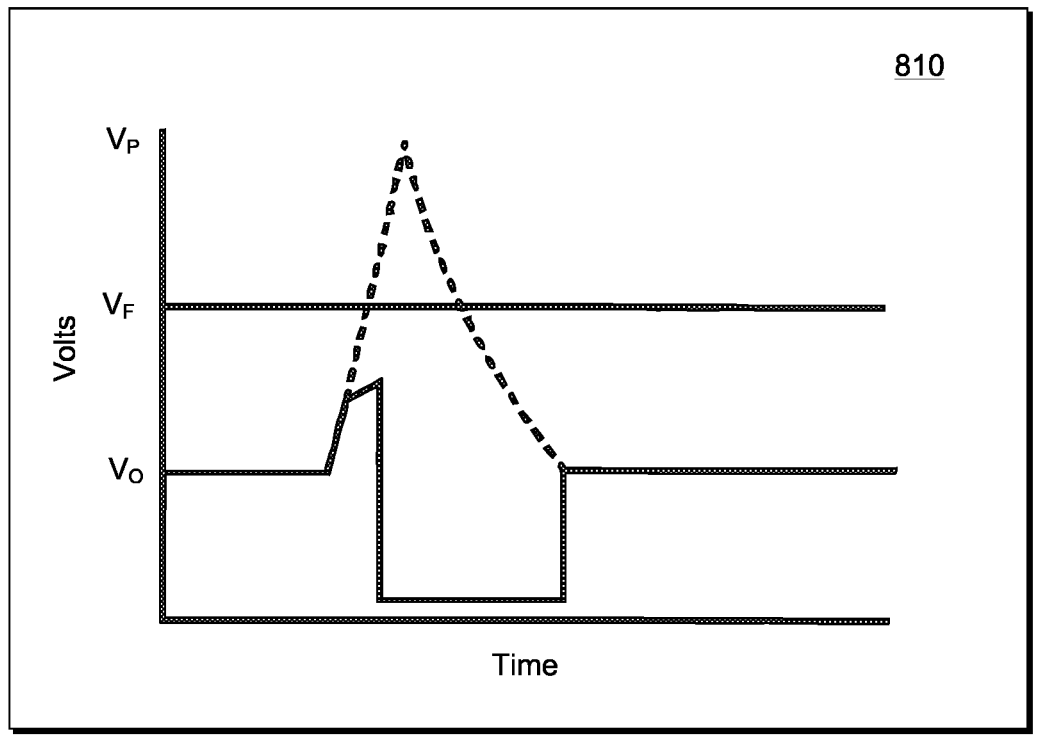
FIG. 8 illustrates an example of a plot and an example of a diagram.
Figure 8:
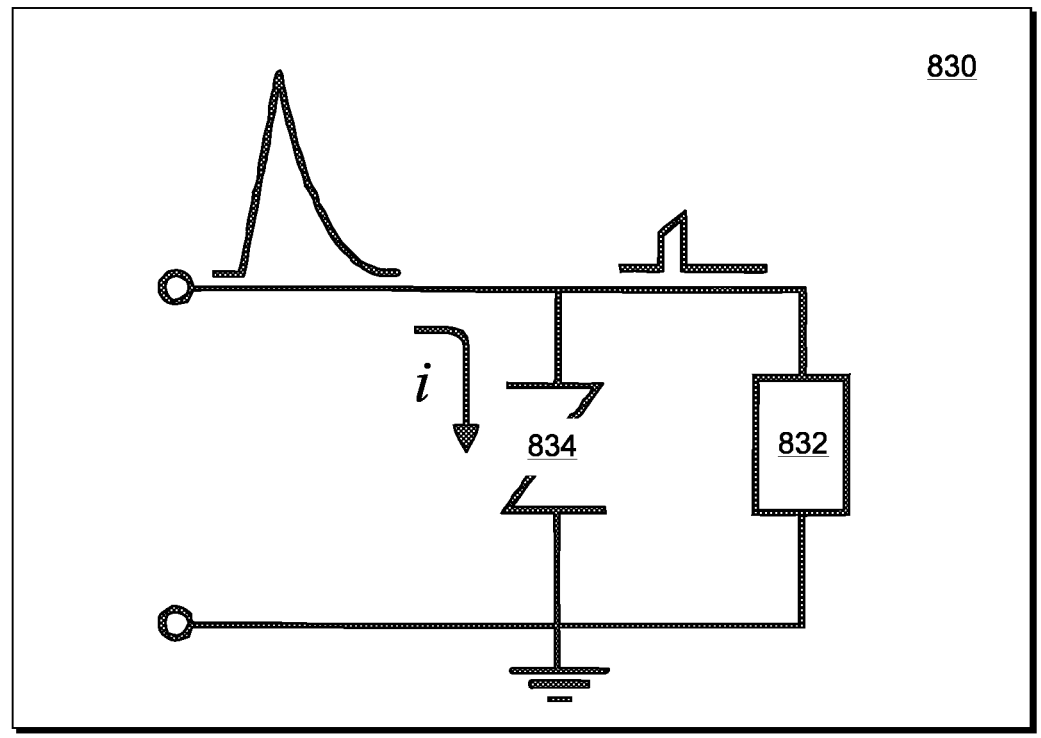

FIG. 8 shows an example plot 810 and an example diagram 830 as related to arresting voltage transients. In the plot 810, voltage is shown with respect to time for a transient that is arrested by clamping. For example, an operating voltage can be VO and a transient voltage can give rise toward a failure voltage VF to a peak voltage VP. Where protection circuitry is included in an assembly, as the voltage rises due to the transient, protection circuitry can crowbar to on-state to at least partially arrest the transient (e.g., via a clamping mechanism).

In the diagram 830, the transient is shown as traveling along a conductive pathway that includes circuitry 832 where protection circuitry 834 diverts current toward ground to help protect the circuitry 832. In the example of FIG. 8, the diagram 830 shows a residual or clamped transient that may reach the circuitry 832 but be of a level that is less than a failure voltage ($V_F$) of the circuitry 832.

As an example, the board 750 may not experience an effect of board 760 due to high impedance of the board 760 and, for example, when voltage reaches a certain level, the board 760 can operate to arrest the voltage and, for example, provide an electrical path from a conductor to ground (e.g., via a shield and/or a housing).

As an example, the second circuitry board 760 can include one or more types of protection circuitry. As an example, the second circuitry board 760 can include crowbar circuitry. As an example, a crowbar circuit is an electrical circuit that can protect to varying extent (e.g., based on design, etc.) against an overvoltage condition, for example, to help reduce risk of damage to circuits attached to a transient pathway. As an example, a crowbar circuit can provide a short circuit or low resistance path across a voltage path (e.g., akin to dropping a crowbar across the output terminals of a power supply).

Figure 9:
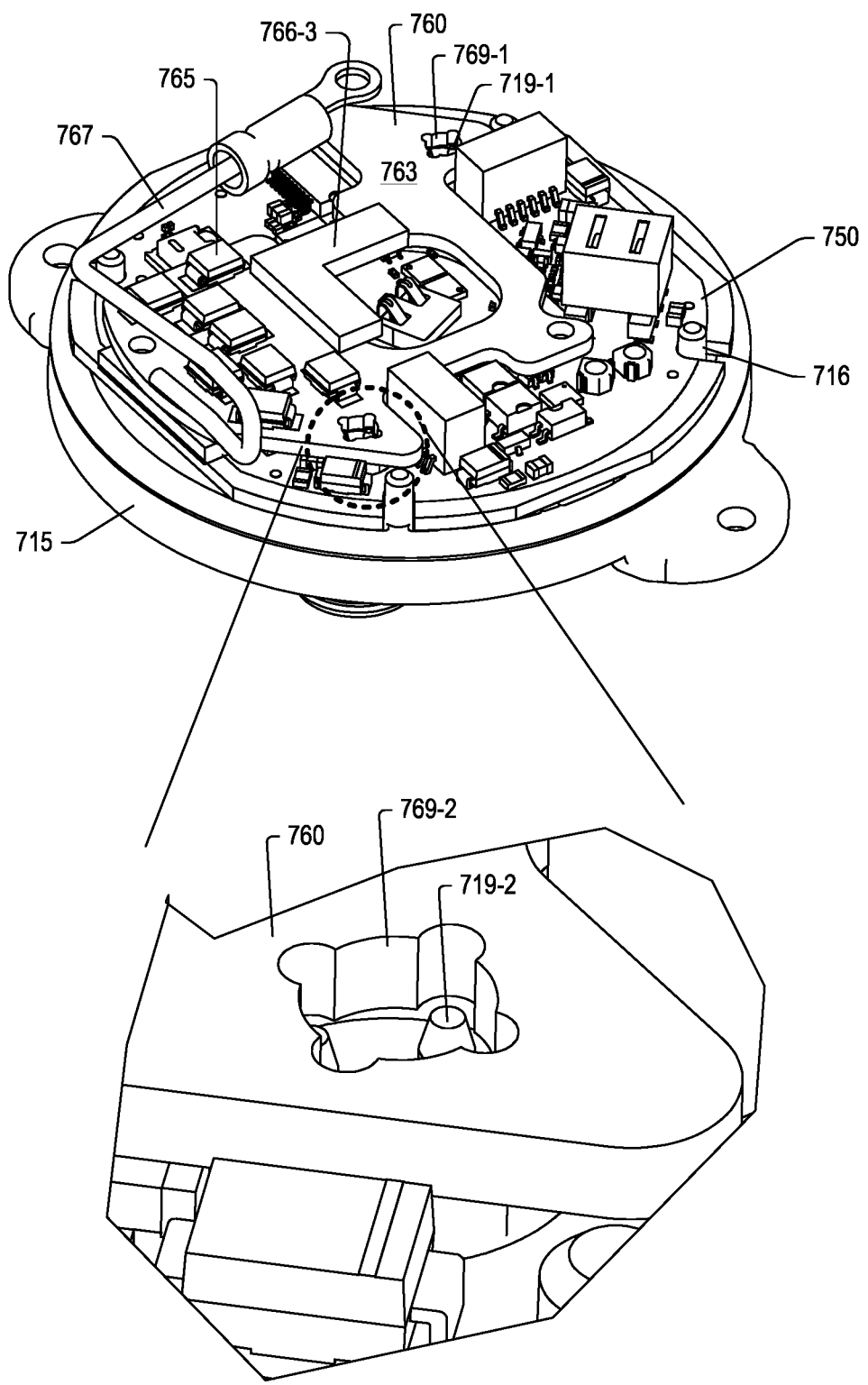
FIG. 9 illustrates a portion of the assembly of FIG. 7.

FIG. 9 shows a view of a portion of the assembly 700 of FIG. 7 where the board 760 is positioned proximate to the board 750, for example, in a piggyback configuration or arrangement. As shown, the board 760 includes a lower side 763 that faces away from the board 750 and can optionally include one or more pads 766-3 (e.g., insulating and resilient to absorb shock, etc.).

As an example, an overvoltage protection circuitry board can include opposing sides where an upper side faces a sensor circuitry board that includes circuitry associated with a seismic energy sensor and where a lower side faces a direction of a sensor unit (e.g., sensor assembly) that includes a seismic energy sensor that is electrically coupled to the circuitry associated therewith as carried by the sensor circuitry board. In such an example, the overvoltage protection circuitry board can be electrically coupled via pins received in sockets of the overvoltage protection circuitry board and via one or more grounding wires (e.g., coupled to a housing, a ground shield, etc. of a sensor unit).

As mentioned, the board 760 may be provided as a unit. In such an example, the unit may be readily inserted and operatively coupled to a sensor unit. As an example, the board 760 may be in contact with the board 750 or may be spaced apart from the board 750, for example, via one or more spacers. As shown in the example of FIG. 9, the board 750 can be oriented via one or more features 716 (e.g., pegs) of the housing insert 715, for example, to assure alignment with the electrical connectors 719-1 and 719-2, which may be electrically connected to one or more cables.

As an example, the board 760 can be coupled to the board 750, for example, consider coupling the board 760 to the board 750 via one or more of the electrical connectors 719-1 and 719-2 and/or corresponding pin connectors of the board 750 (e.g., one or more four pin connectors, etc.). As an example, the electrical connectors 719-1 and 719-2 may pass through the board 750 while being in electrical contact with circuitry of the board 750 and also being in electrical contact with circuitry of the board 760. For example, the electrical connectors 719-1 can be received via the socket 769-1 of the board 760 and the electrical connectors 719-2 can be received via the socket 769-2 of the board 760 where the electrical connectors 719-1 and/or 719-2 are electrically coupled to the board 750 (e.g., via contacts, solder, etc.). As an example, one or more mechanisms may be utilized to electrically couple the electrical connectors 719-1 and/or 719-2 to the board 760 (e.g., contacts, solder, clips, etc.).

As an example, the electrical connectors 719-1 and 719-2 may be structural supports for the board 760. For example, the board 760 may be secured via receipt of the electrical connectors 719-1 and 719-2 in the sockets 769-1 and 769-2. As an example, the sockets 769-1 and 769-2 may be slightly undersized such that an amount of force is applied upon receipt of the electrical connectors 719-1 and 719-2, which may be pins. As an example, an interference fit (e.g., press-fit) may be achieved between sizing and spacing of the sockets 769-1 and 769-2 with respect to the electrical connectors 719-1 and 719-2. As an example, such a fit may be secured, for example, via solder (e.g., soldering the electrical connectors 719-1 and 719-2 to conductive pads, etc., of the board 760). As an example, solder may be a type of material that allows for assembly and disassembly of the board 760 from the sensor unit 700 where, for example, the board 760 is carried by the housing insert 715 and where the board 750 is disposed between the housing insert 715 and the board 760. For example, the housing insert 715, the board 750 and the board 760 may be substantially planar structures that form a sandwich assembly where the board 750 is disposed at least in part between the housing insert 715 and the board 760.

As an example, an interference fit (e.g., press-fit) may be may be achieved between sizing and spacing of the sockets 769-1 and 769-2 with respect to the electrical connectors 719-1 and 719-2. In such an example, physical and electrical connections may be made for the board 760 with respect to the pins 719-1 and 719-2 optionally in a tool-less manner. As mentioned below, the bolt or screw 722-1 may be provided with one or more features for tool-less installation and removal (e.g., optionally as a wing nut on a stud set in the housing, etc.). As an example, the insert 715 may be installable and removable in a tool-less manner. As an example, various components of a sensor unit may be installable and removable in a tool-less manner to allow, for example, for installation of the board 760 in a tool-less manner.

In the example of FIG. 9, the board 760 is shown as including one or more protection circuitry components 765 that are in one or more electrical circuits of the board 760 as electrically coupled to the pins 719-1 and 719-2 (e.g., directly and/or indirectly).

Figure 10:
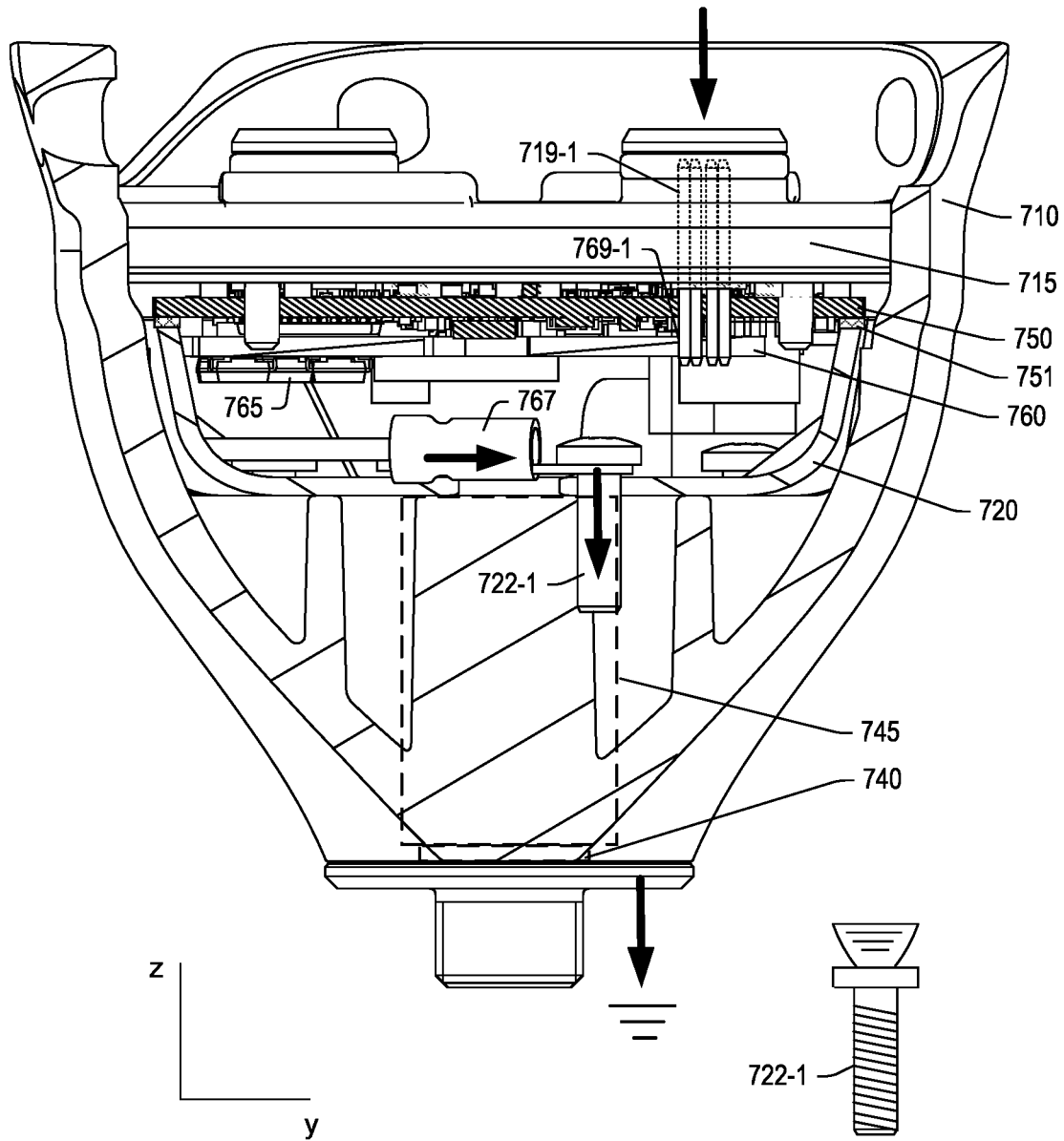
FIG. 10 illustrates, in a cutaway view, the assembly of FIG. 7.

FIG. 10 shows an approximate cutaway view of the assembly 700. In the view of FIG. 10, dashed lines represent a seismic system geophone accelerometer or accelerometers (a seismic system GAC) as a sensor assembly 745 that can sense motion, for example, as operatively coupled to a sensor driver 740, which is also illustrated in dashed lines.

In the example of FIG. 10, the board 760 is arranged to be positioned between the sensor driver 740 (e.g., a GAC) and the electronics of the board 750. In such an arrangement, the conductive wire 767 (e.g., solid, stranded, etc.) can run beneath the board 760 such that it may avoid contact with the board 750. As shown, the conductive wire 767 (e.g., ground wire or wires) is insulated with electrical insulation and includes a coupling that is also partially insulated by electrical insulation. The coupling may include an eye (e.g., an aperture) such that it can be electrically coupled to the ground shield 720, for example, via the bolt or screw 722-1, etc. As shown in FIG. 10, the bolt or screw 722-1 may include a feature or features that allow for hand tightening and loosening via fingers of a hand to allow for tool-less installation. As an example, a bolt may be set in the housing 710 and include a wing nut that can allow for finger tightening and loosening for tool-less installation.

In the example of FIG. 10, the protection circuitry components 765 are oriented downwardly toward the base of the housing 710 (e.g., toward the bottom of the housing 710). In such an example, the components 765 are positioned within a recess defined by the ground shield 720 and further separated from the board 750 via the substrate of the board 760. Thus, where damage, heating, etc., may occur to one or more of the components 765, the effects thereof with respect to the board 750 may be reduced. As an example, depending on couplings, features, etc., the board 750 may be operable in various circumstances where one or more of the components of the board 760 are inoperable, damaged, etc.

In the example of FIG. 10, the assembly 700 may include a component 751 that is disposed between the ground shield 720 and the board 750. In such an example, the component 751 may be an insulator that electrically insulates the board 750 from the ground shield 720. As an example, the component 751 may be optional and, for example, the board 750 may be electrically coupled to the ground shield 720 at an upper rim of the ground shield 720 (e.g., via lower electrical contact pads of the board 750).

In FIG. 10, arrows illustrate an electrical pathway from the pins 719-1 to the socket 769-1 to the conductive wire 767 to the bolt or screw 722-1 and to ground via the housing 710 or a component coupled to the housing 710. As mentioned, circuitry of the board 760 (e.g., including the components 765) can act in a crowbar manner to protect circuitry of the board 750. Such circuitry can be part of the electrical pathway from the socket 769-1 (e.g., and optionally one or more other sockets) to one or more of the components 765.

As an example, where a field installation includes a sensor unit that is operatively coupled to two cables via two sets of pins, a lightning strike that imparts energy to either of the two cables can be handled via an overvoltage protection circuitry board such as, for example, the board 760. In various examples, a single board can handle energy transmitted via two cables. As an example, a sensor unit may be fit with a single board or a plurality of boards to handle energy transmitted via one or more cables. As an example, a board can include a single set of components (e.g., GDTs, TSPDs, etc.) that can handle energy transmitted by one or more of a set of cables coupled to a sensor unit (e.g., a sensor assembly).

As an example, a board can optionally include a plurality of sets of components that can handle energy transmitted by a plurality of cables where a one-to-one correspondence may exist between a set of components and each individual cable. For example, a board such as the board 760 may include two sets of overvoltage protection circuitry, one for a first cable and one for a second cable. In such an example, a common ground wire may be provided or, for example, two ground wires may be provided (e.g., one for each set of overvoltage protection circuitry). As an example, each cable coupled to a sensor unit can have an associated set of overvoltage protection circuity. In such an example, where a double-strike occurs (e.g., near simultaneous strikes to effecting each of two cables), the load may be handled separately for each cable.

Figure 11:
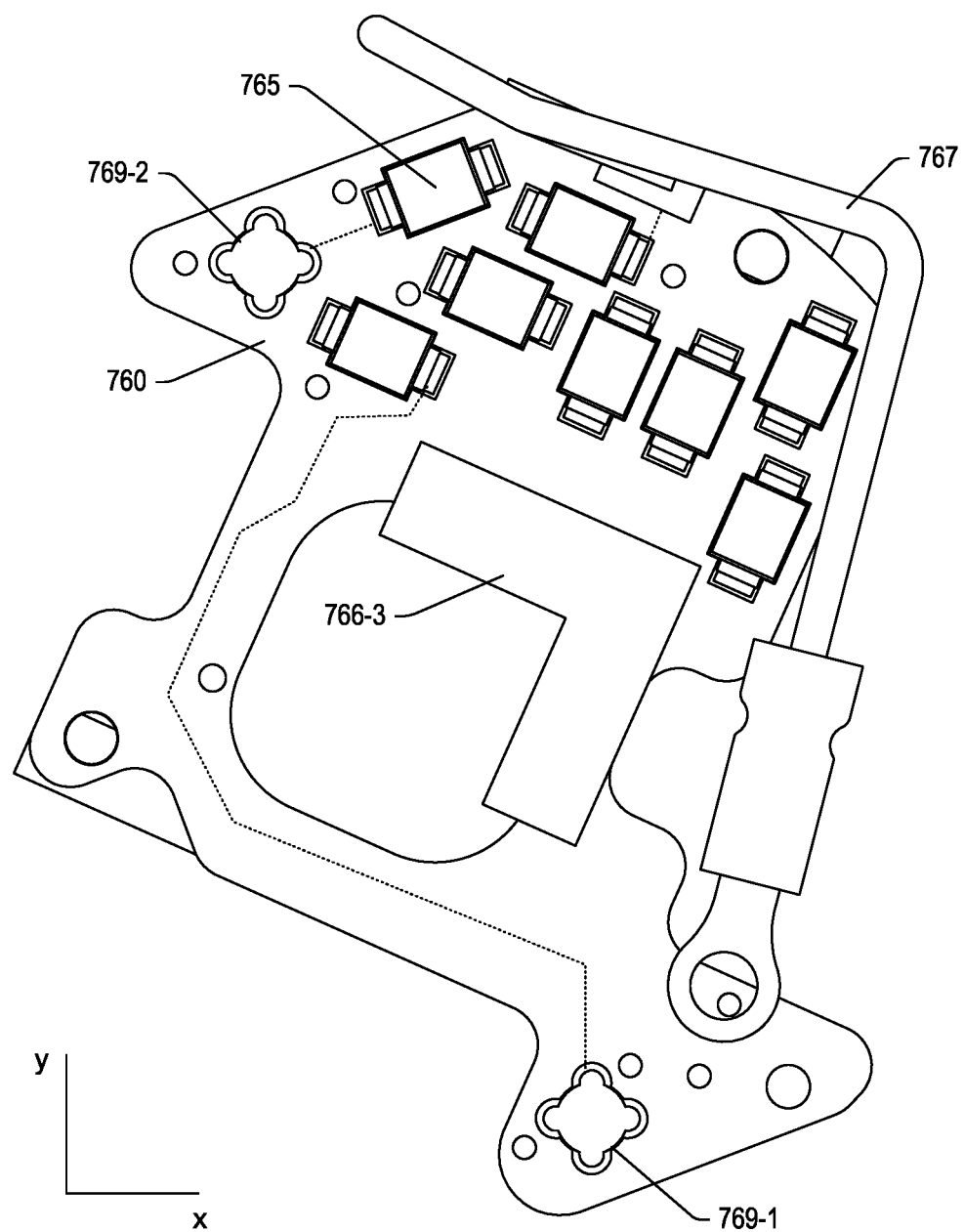
FIG. 11 illustrates, in a plan view, an example of a board.

FIG. 11 shows a plan view (e.g., bottom side view) of the board 760, which is shown as an example of a protection board. As shown, the board 760 includes a plurality of TSPDs 765; noting that one or more other suitable types of arresting features may optionally be utilized, additionally or alternatively. FIG. 11 also shows the board 760 as including the conductive wire 767.

In the example of FIG. 11, a damping member may be included, for example, consider the pad 766-3 that may provide for damping energy associated with mechanical and/or electrical shock (e.g., as may be associated with handling, seismic sensing, arresting overvoltage, etc.). As an example, a damping member can be made of a polymeric material that is resilient and that is an insulator. As an example, the sockets 769-1 and 769-2 can include castellated solder joints. For example, the sockets 769-1 and 769-2 can be castellated mounting holes (e.g., castellated vias, castellations, etc.).

In the example of FIG. 11, various dotted lines are shown to indicate that electrical connections exist for the board 760, which may be a printed circuit board (PCB). As an example, printed circuits can include copper that provide electrical connections between various features, components, etc., of the board 760.

As an example, the board 760 may be shaped to accommodate one or more components of the board 750. As an example, the board 760 may include an axis that is perpendicular to the board 760 and that can be substantially aligned with an axis that is perpendicular to the board 750. As an example, the board 760 may rest on the board 750 and be electrically coupled to the board 760 (e.g., via the electrical connectors 719-1 and 719-2, etc.). As an example, the board 760 may be oriented by the features 716 of the insert 715. As an example, the electrical connectors 719-1 and 719-2 may appropriately orient the board 760 with respect to the board 750. As shown in FIG. 9, the board 760 may be of a smaller footprint than the board 750. For example, an area in a plan view of the board 760 can be less than an area in a plan view of the board 750.

In the cutaway view of FIG. 10, various protection circuitry components of the board 760 (e.g., the components 765) are disposed in a recessed space defined at least in part by the ground shield 720.

As an example, the housing insert 715 can be a cover that covers the boards 750 and 760 and where one or more of the screws or bolts 722 can be utilized to electrically couple the board 760 to the ground shield 720 via the conductive wire 767 and the ground shield 720 to the housing 710. As an example, the board 750 and/or the board 760 may be referred to as a PWA (e.g., a main PWA and a protective PWA).

As an example, energy associated with a lightning strike to a cable and/or a sensor unit (e.g., an assembly such as the assembly 700) may travel to a grounding clamp, to a base and/or a spike of the sensor and into the earth. In such an example, the sensor unit can include circuitry operatively coupled to one or more grounded components of the sensor unit. As an example, such circuitry may provide for arresting transients such that, for example, other circuitry is protected. As an example, protection circuitry may be provided at least in part as a board (e.g., a POP board).

As an example, a spike of a sensor unit can offer an amount of earth/spike contact area that acts to distribute the energy radially, for example, in about 360 degrees into the earth. In such an example, the sensor unit may be considered to be a point source in a hemispherical medium where the energy can dissipate in a hemispherical manner that acts to reduce risk of energy traveling from one sensor to another sensor unit (e.g., via a cable or cables). In such an example, a dimension of a strike impact area may be reduced.

As an example, various components may be nesting components. For example, the board 760 can nest within the housing 710 of the assembly 700 (e.g., also consider the board 760 nesting within the ground shield 720).

As an example, a coordinate system that can be used to describe one or more features of a sensor unit may be a cylindrical coordinate system that includes an angle such as an azimuthal angle (e.g., r, z, Θ). As an example, various features of a sensor unit (e.g., a sensor assembly, etc.) and/or one or more grounding components (e.g., a board, a POP unit, a lightning protection unit, a grounding clamp, etc.) may be described with respect to a coordinate system such as, for example, a cylindrical coordinate system.

As an example, where a plurality of sensor assemblies include one or more protection and/or grounding components, the ability to handle and/or to ground lightning strike energy can increase for an array, which may lead to mitigation of lightning strike damage to the array. For example, a dimension of impact may be reduced where sensor assemblies can individually ground lightning strike energy more effectively and/or arrest transients associated therewith.

As an example, a seismic sensor assembly can include a housing that defines a longitudinal axis; a sensor; sensor circuitry operatively coupled to the sensor; and overvoltage protection circuitry electrically coupled to the housing. In such an example, the sensor circuitry can include circuitry mounted to a first board and the overvoltage protection circuitry can include circuitry mounted to a second board. In such an example, the second board may be mounted to the first board or mounted to one or more connection features, such as, for example, electrical connectors that can be pins. As an example, a seismic sensor assembly can include a first board and a second board where features that can be utilized to couple the two boards. For example, consider pins that can be received by a socket or opening. In such an example, the pins may be fixed to a board, for example, at a boundary of the board that defines the socket or opening. As an example, boards may be provided with matching features for detachably coupling the boards, optionally in a tool-less manner such that a protection circuitry board (e.g., POP, etc.) can be installed in a relatively rapid manner. As an example, a tool-less connection may be made between a wire and a component or components of a sensor assembly. For example, a screw, bolt, etc. of a sensor assembly may be installed with a quick-connect coupling attached thereto such that installation of a protection circuitry board can be readily coupled to the quick-connect coupling via a matching or mating feature where such a feature can be electrically connected to a wire or other conductor that is in electrical contact with circuitry of the protection circuitry board. As an example, an insulated wire can include an end or end feature that can be coupled to a component of a sensor assembly to establish a ground connection between a protection circuitry board and the component (e.g., or components). As an example, the bolt or screw 722-1 as shown in FIG. 10 may include a wing feature or other type of feature that allows for hand tightening and/or loosening in a tool-less manner.

As an example, a footprint of a protection circuitry board (e.g., or protection circuit board) can be less than a footprint of a sensor circuitry board (e.g., or sensor circuit board).

As an example, a seismic sensor assembly can include an insert where sensor circuitry is mounted to the insert (e.g., a housing insert). As an example, the insert may be a cover that covers a chamber defined at least in part by an inner surface of a housing (see, e.g., FIG. 7). As an example, a seismic sensor assembly can include a ground shield where sensor circuitry is disposed axially between an insert (e.g., a cover) and the ground shield. In such an example, overvoltage protection circuitry can be disposed axially between the sensor circuitry and the ground shield.

As an example, a seismic sensor assembly can include a ground shield where overvoltage protection circuitry is electrically connected to the ground shield (see, e.g., FIG. 7). In such an example, a coupling mechanism can be included that connects an electrical coupling of the overvoltage protection circuitry to the ground shield. As an example, such a coupling mechanism may also couple the ground shield to the housing (see, e.g., screws in FIG. 7).

As an example, a seismic sensor assembly can include an electrical coupling that includes a wire that is electrically connected to overvoltage protection circuitry.

As an example, overvoltage protection circuitry can include at least one protection circuit component (e.g., TSPD, GDT, etc.). For example, consider a plurality of protection circuit components, which may be arranged in a common circuit. As an example, a board that includes one or more protection circuit components may include one or more monitor circuits that can be utilized to determine condition of the one or more protection circuit components. For example, where a protection circuit component has been damaged, a monitor circuit can provide an indication of such damage.

As an example, a sensor assembly may include communication circuitry that can communicate a status of one or more components of overvoltage protection circuitry. In such an example, a message may be formatted for communication via a communication mechanism that is utilized for a communication of sensed seismic information. For example, a message may be communicated prior to, during and/or after sensing of seismic information where the message includes information germane to the status of one or more components and/or, for example, an indication that the protection circuitry has been utilized to arrest a transient or transients. In such an example, a sensor assembly may be identified (e.g., optionally via GPS, etc.) and serviced, for example, to replace its overvoltage protection circuitry and/or one or more components thereof. As an example, a sensor circuitry board can include a trigger that is responsive to utilization of the overvoltage protection circuitry and that may, for example, include a counter that can be incremented responsive to actuation of the trigger. In such an example, a number of arrests may be stored. As an example, such stored information may be accessible, for example, as part of a health report of one or more components of a sensor assembly.

As an example, where protection circuitry includes one or more protection circuit components and where the protection circuitry is mounted to an insert (e.g., a cover), for example, via a sensor circuitry board, lifting of the insert may reveal the one or more protection circuit components for purposes of visual inspection. For example, a user may look for discoloration, blackening, melting, or one or more other signs of a surge event and resulting damage. As an example, test circuitry may include applying a slow-rising DC voltage to a protection circuit component or protection circuit components to verify operation and, for example, a turn-on voltage. Where replacement and/or removal of protection circuitry such as a protection circuitry board is desired, the protection circuitry may be removed and optionally replaced without removal of sensor circuitry (e.g., of a sensor circuitry board).

As an example, a seismic sensor assembly can include a chamber defined by a ground shield disposed within a housing where at least one protection circuit component is disposed within the chamber. In such an example, overvoltage protection circuitry can include a board where the board can be disposed between the at least one protection circuit component and at least a portion of sensor circuitry, which can be oriented via features of an insert, which may be a cover that covers an interior space of the housing (e.g., a housing cover).

As an example, a method can include mounting an overvoltage protection circuit board to a sensor circuit board of a seismic sensor where the sensor circuit board is mounted to a housing cover; electrically coupling a wire of the overvoltage protection circuit board to a ground shield via a coupling mechanism that couples the ground shield to a housing; and securing the housing cover to the housing. In such an example, the method can include arresting a voltage transient via circuitry of the overvoltage protection circuit board to protect circuitry of the sensor circuit board.

As an example, an overvoltage protection circuitry unit kit for a seismic sensor assembly can include a board that includes a first side, a second side and mounting features that correspond to features of a seismic sensor circuit board to face the first side toward the seismic sensor circuit board; and circuitry mounted to the second side of the board wherein the circuitry comprises at least one protection circuit component. In such an example, the kit may include a wire electrically coupled to the circuitry and a coupling that includes a dimension that accommodates a ground shield-to-housing coupling mechanism. For example, consider a wire with a end coupling that includes an opening that can be disposed at least in part about a diameter of a screw, a bolt, etc. In such an example, the screw, the bolt, etc. may be tightened to secure the end coupling and, for example, to secure, at least in part, a ground shield to the housing.

As an example, a system may include one or more modules, which may be provided to analyze data, control a process, perform a task, perform a workstep, perform a workflow, etc.

Figure 12:
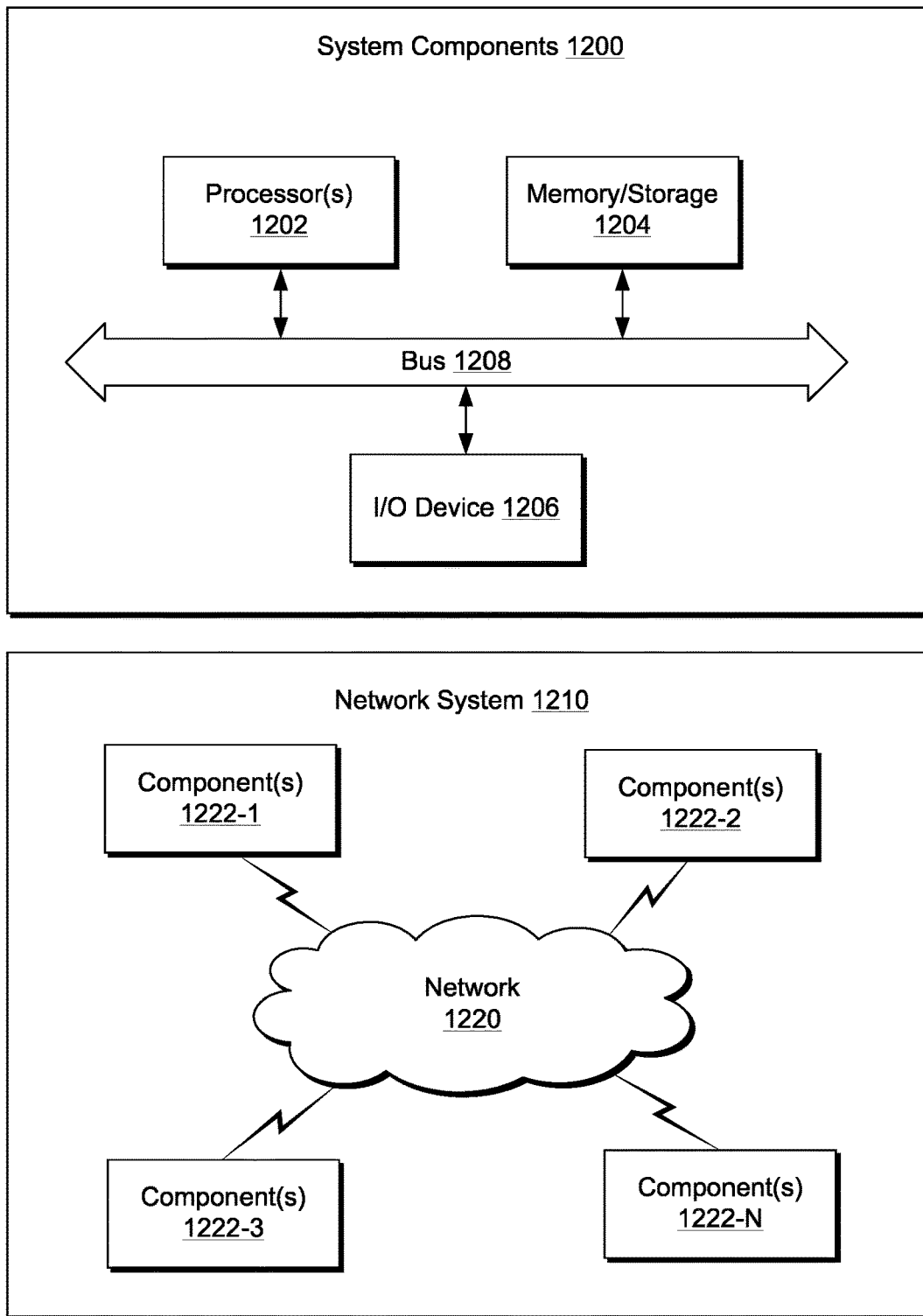
FIG. 12 illustrates example components of a system and a networked system.

FIG. 12 shows components of an example of a computing system 1200 and an example of a networked system 1210. The system 1200 includes one or more processors 1202, memory and/or storage components 1204, one or more input and/or output devices 1206 and a bus 1208. In an example embodiment, instructions may be stored in one or more computer-readable media (e.g., memory/storage components 1204). Such instructions may be read by one or more processors (e.g., the processor(s) 1202) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1210. The network system 1210 includes components 1222-1, 1222-2, 1222-3, . . . 1222-N. For example, the components 1222-1 may include the processor(s) 1202 while the component(s) 1222-3 may include memory accessible by the processor(s) 1202. Further, the component(s) 1222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A sensor assembly, comprising:
a housing unit associated with a longitudinal axis through the sensor assembly;
a housing insert comprising one or more electrical connectors configured to couple to one or more cables, wherein the housing insert is coupled to the housing unit;
a first circuitry board comprising sensor circuitry mounted to a first side of the housing insert;
a second circuitry board electrically coupled to the first circuitry board comprising overvoltage protection circuitry configured to arrest at least a first portion of energy associated with one or more overvoltage transients to a ground via a first electrically conductive pathway comprising the one or more cables, the one or more electrical connectors, and the overvoltage protection circuitry; and
a ground shield conductively coupled to the housing unit and the second circuitry board, wherein the ground shield is configured to route at least a second portion of the energy associated with the one or more overvoltage transients to the ground via a second electrically conductive pathway comprising the one or more cables, the one or more electrical connectors, the ground shield, and the housing unit, wherein the at least the second portion is different from the at least the first portion of the energy.

2. The sensor assembly of claim 1, wherein the housing unit comprises:
a first space between the housing insert and the first circuitry board;
a second space between the second circuitry board and the ground shield; and
an insulative component configured to electrically insulate the first circuitry board from the ground shield.

3. The sensor assembly of claim 2, wherein the second space is configured to limit heat dissipation associated with the one or more overvoltage transients.

4. The sensor assembly of claim 3, wherein the second space is larger than the first space.

5. The sensor assembly of claim 1, wherein the first circuitry board comprises a geophone accelerometer circuitry (GAC) board comprising a seismic system geophone accelerometer disposed inside the housing unit.

6. The sensor assembly of claim 1, wherein the second circuitry board comprises a printed circuit board (PCB) comprising one or more gas discharge tubes (GDTs), one or more thyristor surge protection devices (TSPDs), one or more metal oxide varistors (MOVs), or a combination thereof.

7. The sensor assembly of claim 1, wherein the first circuitry board comprises a first cross-sectional area that is larger than a second cross-sectional area of the second circuitry board.

8. The sensor assembly of claim 1, comprising a removable base configured to contact the ground and configured to support and orient the sensor assembly on the ground.

9. The sensor assembly of claim 8, wherein the removable base comprises a plate, a spike, or a tripod and is composed at least in part of electrically conductive material configured to route the energy associated with the one or more overvoltage transients to the ground.

10. The sensor assembly of claim 9, wherein the first electrically conductive pathway comprising the one or more cables, the one or more electrical connectors, the overvoltage protection circuitry, and the removable base.

11. The sensor assembly of claim 9, wherein the second electrically conductive pathway comprising the one or more cables, the one or more electrical connectors, the ground shield, and the removable base.

12. The sensor assembly of claim 1, wherein the one or more overvoltage transients are associated with one or more lighting strikes.

13. An overvoltage protection kit, comprising:
a circuitry board comprising a first side, a second side, and mounting features corresponding to a sensor assembly, wherein the sensor assembly comprises a housing, a housing insert comprising one or more electrical connectors configured to couple to one or more cables, and sensor circuitry disposed on the first side of the circuitry board, wherein the first side is opposite of the second side;
overvoltage protection circuitry disposed on the second side of the circuitry board and configured to arrest at least a first portion of energy associated with one or more overvoltage transients to a ground via a first energy dissipation path comprising the one or more cables, the one or more electrical connectors, and the overvoltage protection circuity; and
a ground shield disposed inside the housing and conductively coupled to the housing, wherein the ground shield is configured to route at least a second portion of the energy associated with the one or more overvoltage transients to the ground via a second energy dissipation path comprising the one or more cables, the one or more electrical connectors, and the ground shield, wherein the at least the second portion is different from the at least the first portion of the energy.

14. The overvoltage protection kit of claim 13, comprising
a removable base composed at least in part of electrically conductive material and configured to:
route the at least the first portion of the energy associated with the one or more overvoltage transients to the ground via the first energy dissipation path and the removable base; and
route the at least the second portion of the energy associated with the one or more overvoltage transients to the ground via the second energy dissipation path and the removable base.

15. The overvoltage protection kit of claim 14, wherein the removable base comprises a plate, a spike, or a tripod conductively coupled to the housing.

16. The overvoltage protection kit of claim 15, comprising a grounding clamp conductively coupled to the removable base, wherein the grounding clamp comprises a substantially U-shaped electrically conductive component coupled to the sensor assembly at a first end and to the removable base at a second end.

17. The overvoltage protection kit of claim 16, wherein the overvoltage protection kit is configured to:
arrest the at least the first portion of the energy associated with the one or more overvoltage transients to the ground via the first energy dissipation path, the ground shield, and the removable base;
route the at least the second portion of the energy associated with the one or more overvoltage transients to the ground via the second energy dissipation path, the grounding clamp, and the removable base.

18. A method; comprising:
disposing a ground shield inside a housing of a sensor assembly, wherein the housing comprises a housing insert, seismic sensor circuitry, the ground shield, and overvoltage protection circuitry, wherein the housing insert comprises one or more electrical connectors configured to couple to one or more cables;
disposing the seismic sensor circuitry on a first side of a circuitry board;
disposing the overvoltage protection circuitry on a second side of the circuitry board, wherein the second side is opposite to the first side of the circuitry board;
mounting the circuitry board to the housing insert, wherein the seismic sensor circuitry is disposed between the housing insert and the overvoltage protection circuitry;
forming a first electrically conductive pathway by electrically coupling the one or more cables, the one or more electrical connectors, the seismic sensor circuitry, and the overvoltage protection circuity, wherein the first electrically conductive pathway is configured to arrest at least a first portion of energy associated with one or more overvoltage transients to a ground; and
forming a second electrically conductive pathway by electrically coupling the ground shield to the one or more cables and the housing, wherein the second electrically conductive pathway is configured to route at least a second portion of the energy associated with the one or more overvoltage transients to the ground.

19. The method of claim 18, comprising a base composed at least in part of electrically conductive material, wherein the at least the first portion of the energy associated with the one or more overvoltage transients is routed to the ground via the first electrically conductive pathway and the base, and wherein the at least the second portion of the energy associated with the one or more overvoltage transients is routed to the ground via the second electrically conductive pathway and the base.

20. The method of claim 18, wherein the housing insert is configured to cover a chamber defined at least in part by an inner surface of the housing and the ground shield, wherein the overvoltage protection circuitry is positioned within a recess defined by the ground shield and separated from the seismic sensor circuitry via a substrate of the circuitry board, wherein the chamber is configured to limit heat dissipation associated with the one or more overvoltage transients.

* * * * *